United States Patent [19]
Foster

[11] Patent Number: 6,026,949
[45] Date of Patent: Feb. 22, 2000

[54] DRIVE UNITS AND DRIVE ASSEMBLY FOR RECIPROCATING SLAT CONVEYORS

[76] Inventor: Raymond Keith Foster, P.O. Box 1, Madras, Oreg. 97741

[21] Appl. No.: 09/363,213

[22] Filed: Jul. 29, 1999

Related U.S. Application Data

[62] Division of application No. 09/275,473, Mar. 24, 1999.

[51] Int. Cl.[7] .................................................. B65G 25/04
[52] U.S. Cl. ..................................... 198/750.5; 198/750.7; 414/525.1; 91/189 A; 91/189 R
[58] Field of Search .............................. 198/750.1, 750.2, 198/750.5, 750.6, 750.7; 414/525.1, 525.9; 91/189 R, 189 A

[56] References Cited

U.S. PATENT DOCUMENTS

| | | | |
|---|---|---|---|
| Re. 35,022 | 8/1995 | Foster | 198/750.5 |
| 4,691,819 | 9/1987 | Hallstrom, Jr. | 198/750.1 |
| 4,821,868 | 4/1989 | Foster | 414/525.1 |
| 5,638,943 | 6/1997 | Foster | 198/750.5 |

*Primary Examiner*—William E. Terrell
*Assistant Examiner*—Mark A. Deuble
*Attorney, Agent, or Firm*—Delbert J. Barnard

[57] ABSTRACT

Three tandem drive units are provided. Outward variable volume working chambers at one end of the drive units are connected via passageways in the piston rods with inward variable volume working chambers at the opposite end of the drive units. In similar fashion, inward variable volume working chambers at the first ends of the drive units are connected to outward variable volume working chambers at the second ends of the drive units, also via passageways in the piston rods. At each end of the assembly, the piston rods pass through piston rod receiving openings in a cylinder head forming member. Each cylinder head forming member includes a manifold passageway and spool valves for controlling a sequencing movement of the drive units. The piston rods provide the spools for the spool valves.

12 Claims, 27 Drawing Sheets

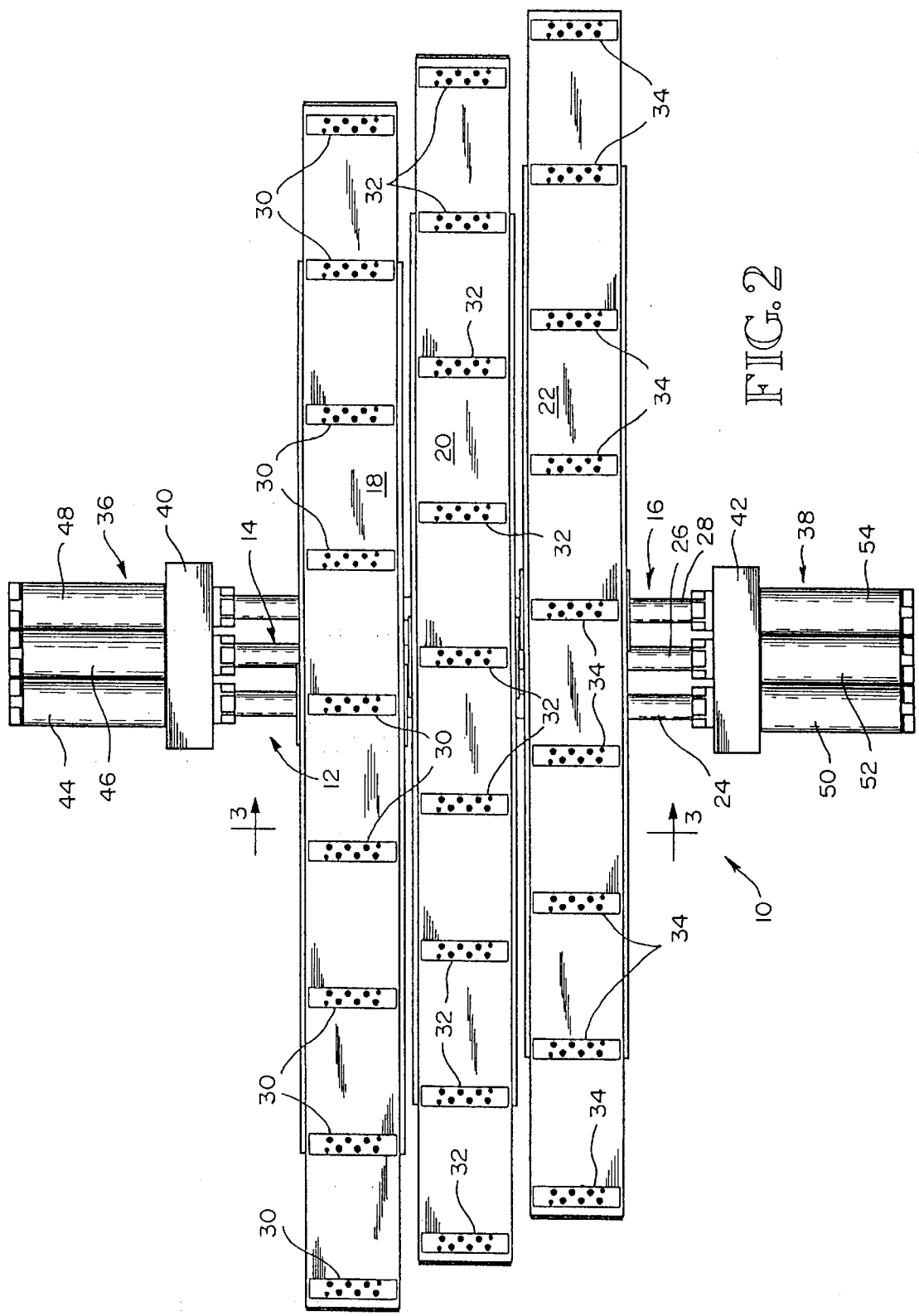

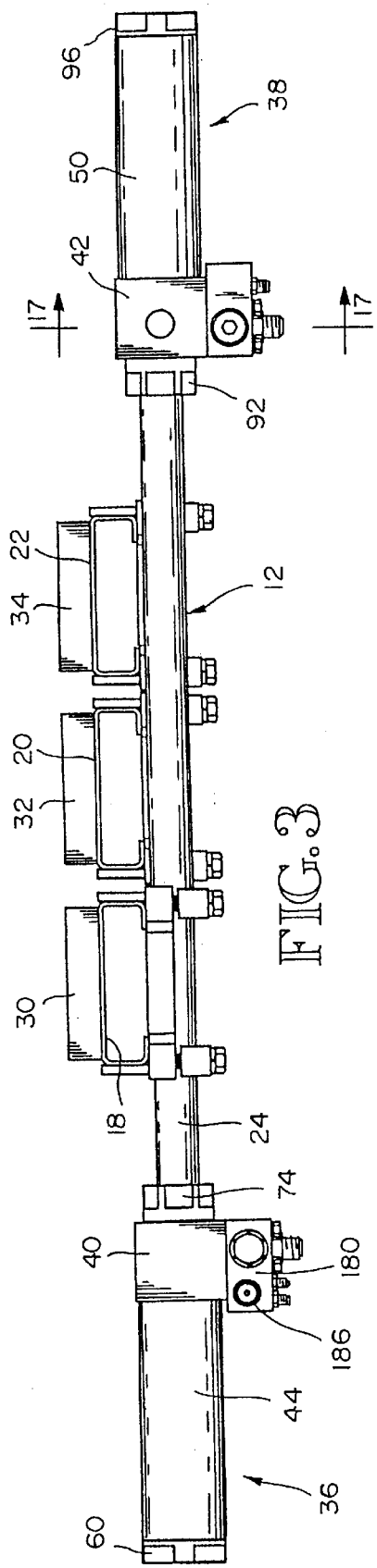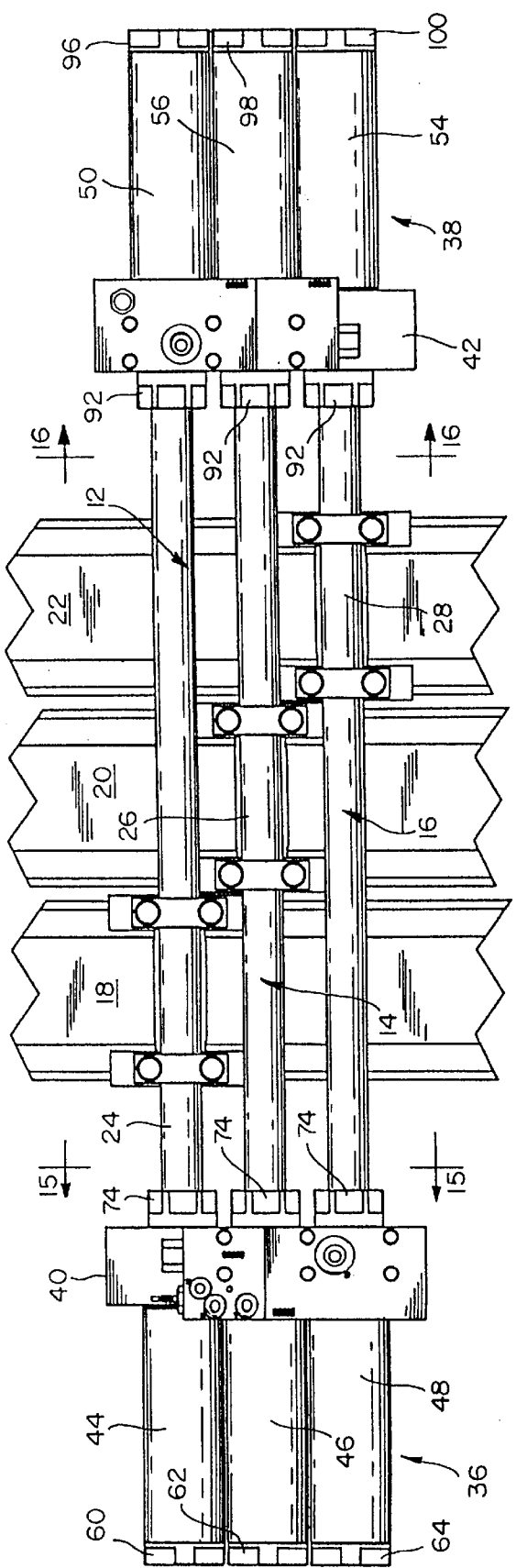

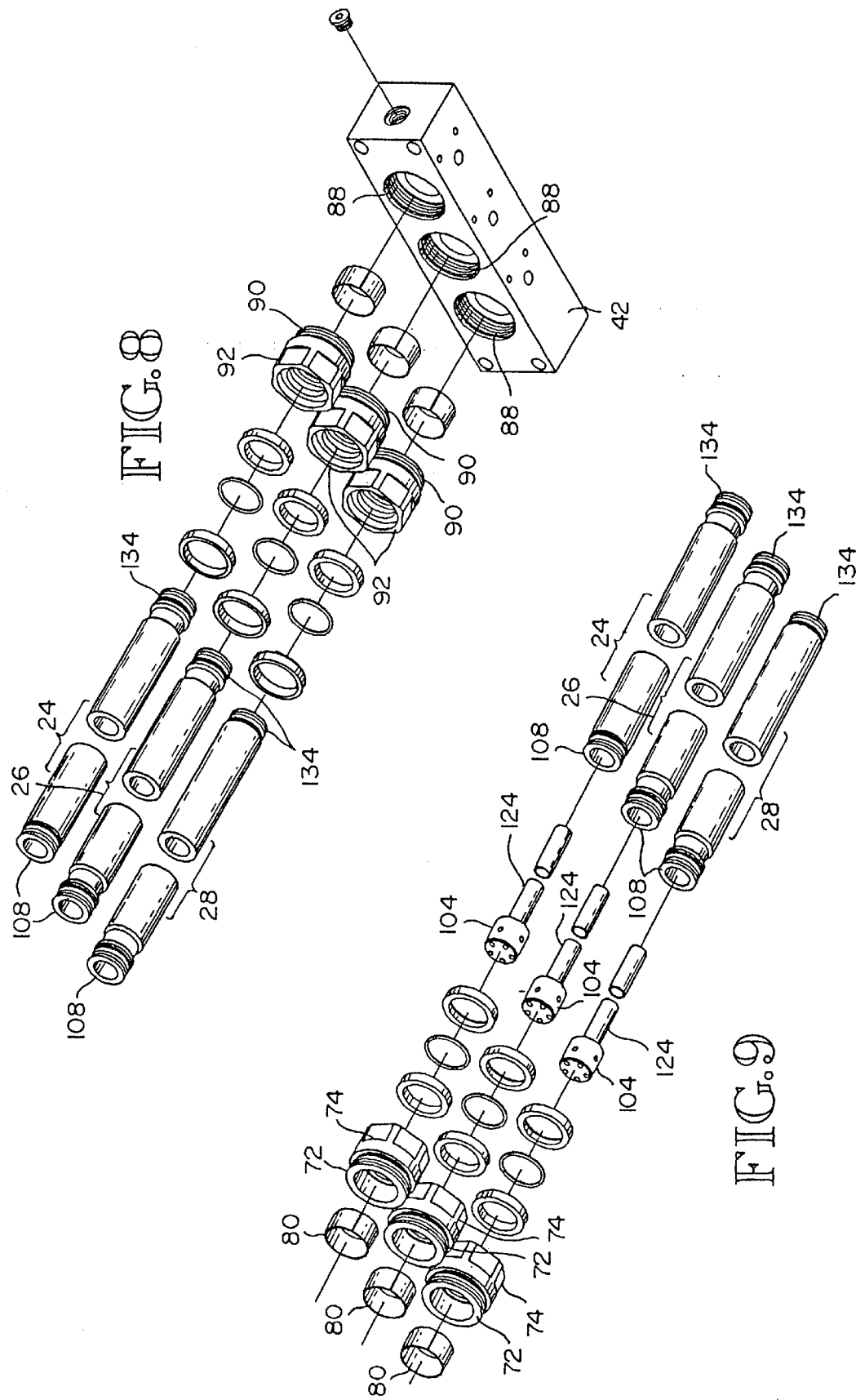

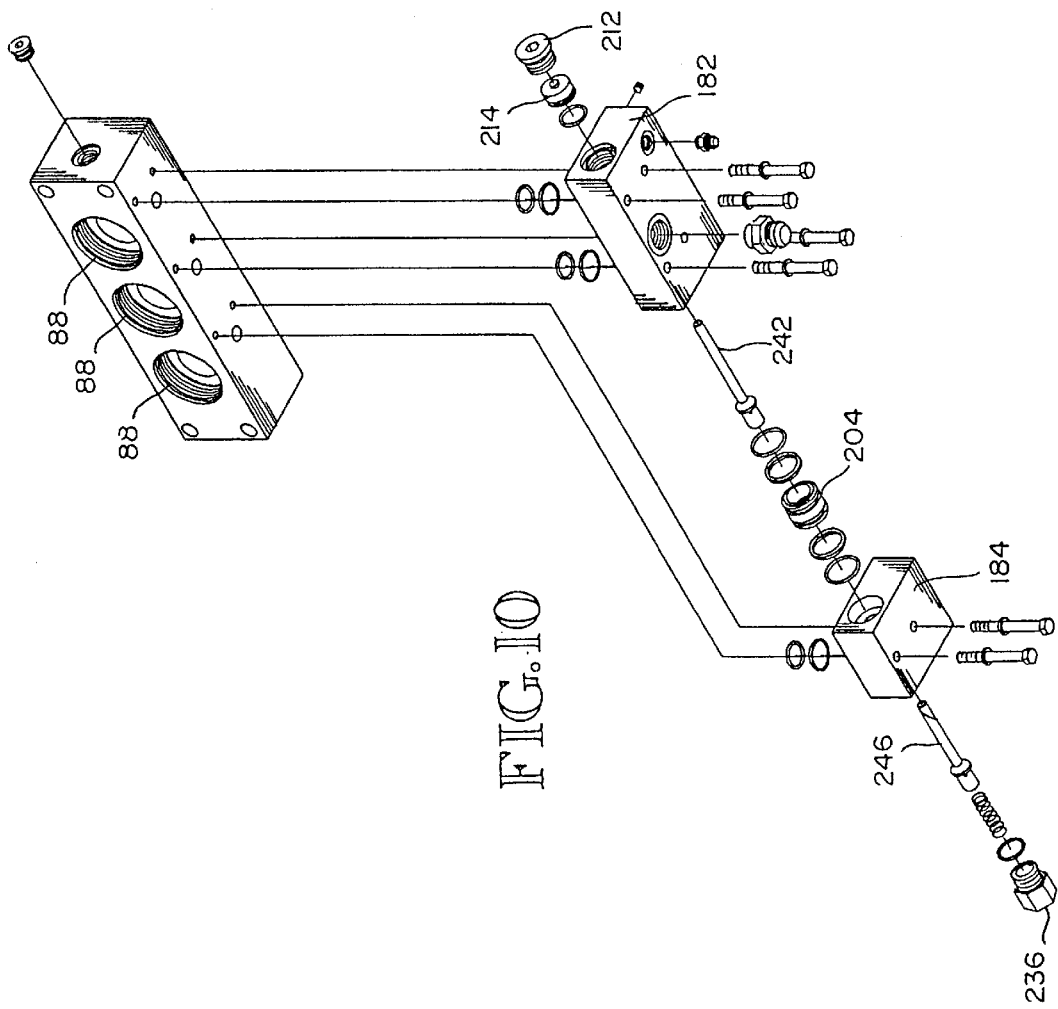

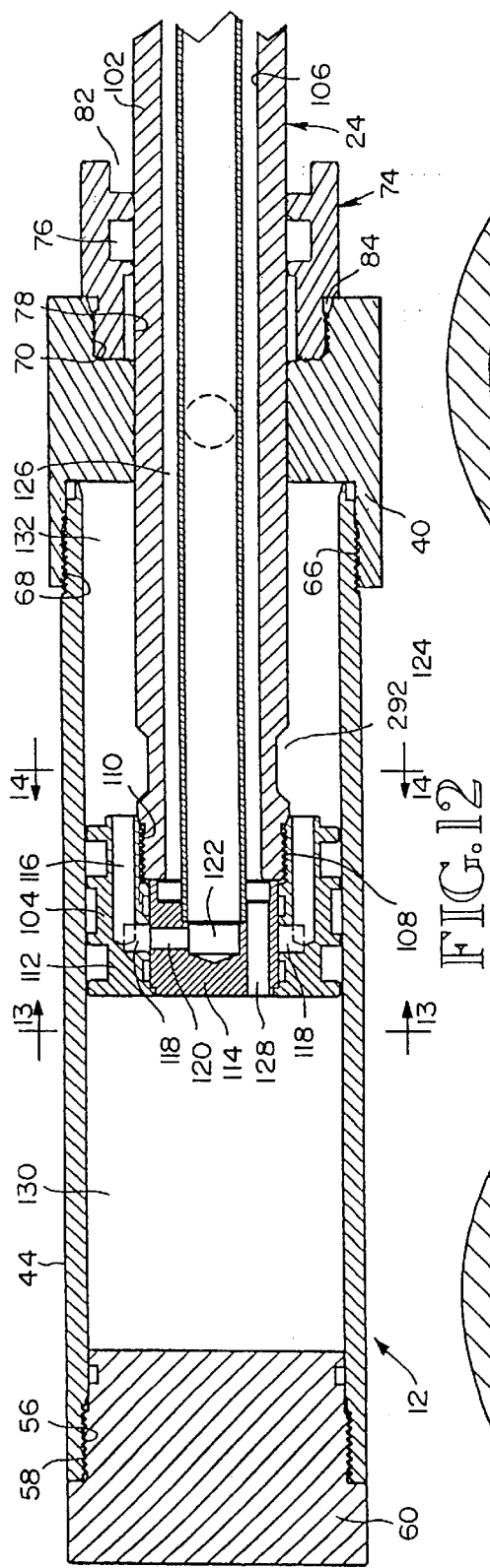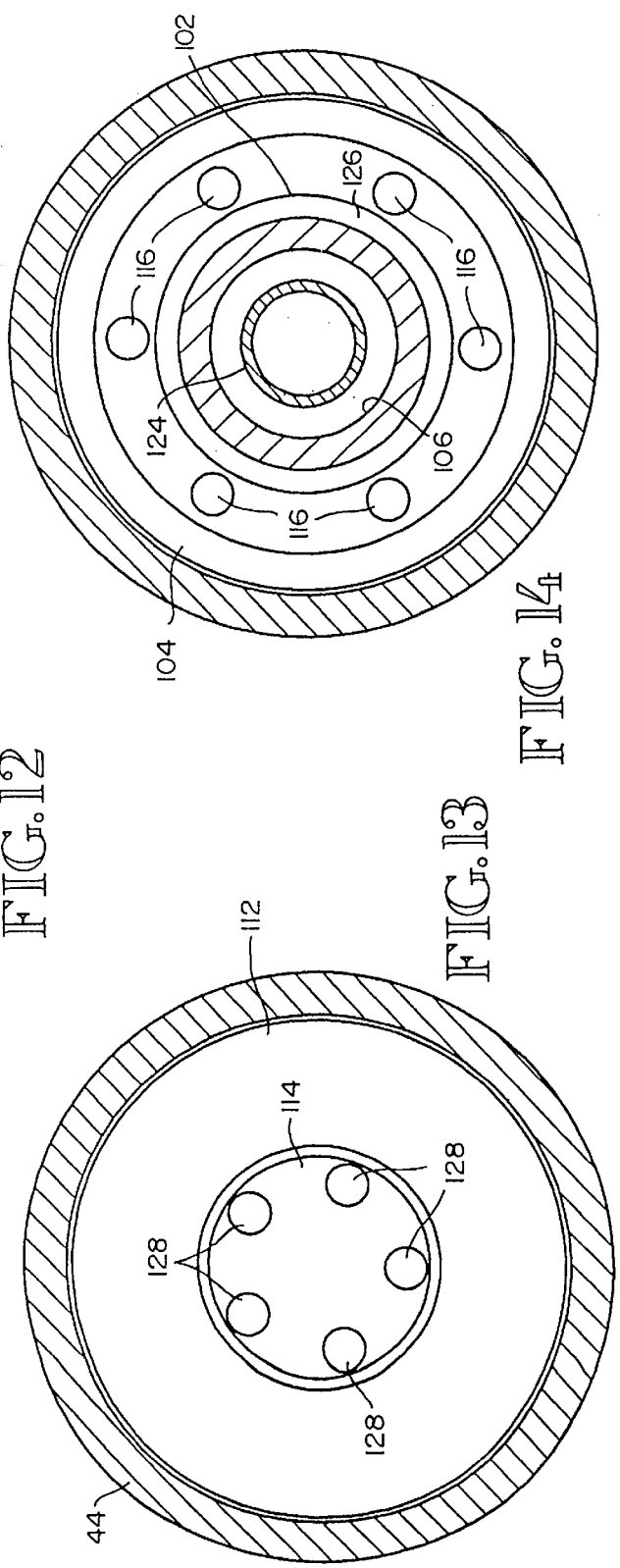

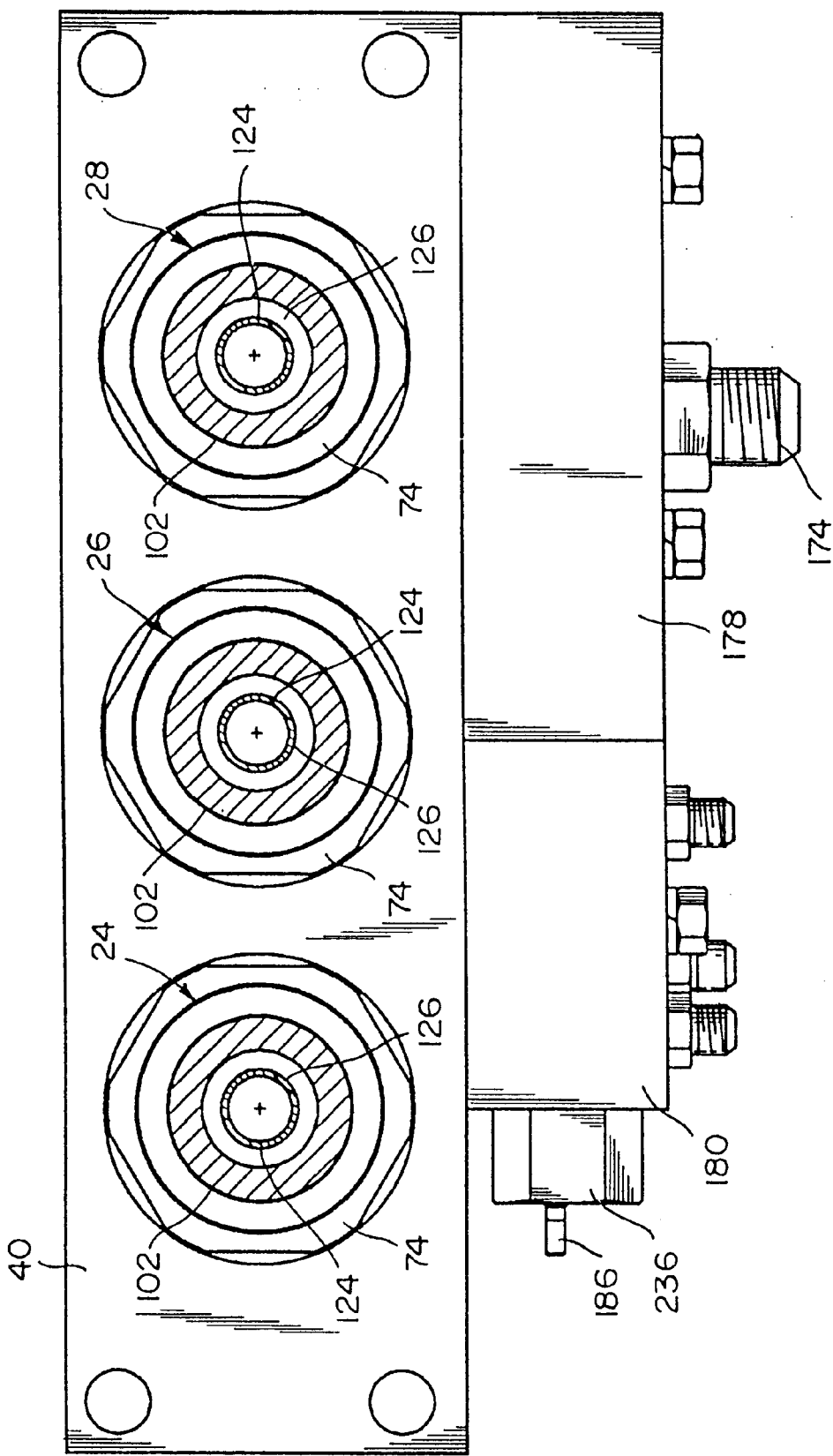

DRIVE UNITS AND DRIVE ASSEMBLY FOR RECIPROCATING SLAT CONVEYORS

RELATED APPLICATION

This is a division of Ser. No. 09/275,473, filed Mar. 24, 1999, and entitled Drive Units And Drive Assembly For Reciprocating Slat Conveyors.

TECHNICAL FIELD

This invention relates to improvements in reciprocating slat conveyors and, in particular, to the provision of an improved drive assembly that eliminates most of the external hoses that are essential in the prior art drive assemblies of its type. It is also relates to the provision of improved linear hydraulic drive units.

BACKGROUND ART

Reciprocating slat conveyors powered by linear hydraulic motors became more than a curiosity in about 1974 when it was discovered that sequencing could best be controlled by controlling the release of oil from the motors rather than the delivery of oil to the motors. The next significant discovery was the discovery that drive units could be used as beams and be subjected to an applied side load contrary to the previous wisdom of the art that linear hydraulic drive units should not be side loaded. This discovery led to the development of a reduced size drive assembly, an early example of which is disclosed in U.S. Pat. No. Re. 35,022, granted Aug. 22, 1995, to Raymond K. Foster, and entitled, "Reduced Size Drive/Frame Assembly For A Reciprocating Floor Conveyor."

An effort has been made to use terms herein that will name the drive assembly components without imposing detail or limitations that are not necessary to the invention. A "linear hydraulic motor" is but one of many names given to a hydraulic device that is composed of piston and cylinder components, one of which is fixed and the other of which is allowed to move back and forth along a linear path. Movement is caused by introducing and removing hydraulic fluid pressure to and from variable volume working chambers formed by and between the fixed and movable components. "Linear hydraulic motors" are also termed "linear actuators", "linear hydraulic drive units", and simply "hydraulic cylinders". A problem with calling them "hydraulic cylinders" when it is necessary to describe them in some detail is that one of the components of the device is also referred to as a "cylinder" or "cylinder component." Herein, the "linear hydraulic motors" that will be described are broadly referred to as "linear hydraulic drive units." The piston components of these drive units are composed of piston rods and piston heads. Each cylinder component includes a tubular or cylindrical sidewall, a cylinder head at one end through which the piston rod extends, and an end wall at the opposite end. Herein, the term "cylinder tube" is used to name the cylinder sidewall.

U.S. Pat. No. 4,821,898, granted Apr. 18, 1989 to Raymond K. Foster, and entitled "Drive/Frame Assembly For A Reciprocating Floor" discloses a drive assembly that is similar to the drive assembly disclosed in the aforementioned U.S. Pat. No. Re. 35,022 except that its drive units are a tandem type having fixed opposite end portions that are piston components and a movable central portion that is a cylinder component. This particular type of tandem drive unit eliminates external hoses by incorporating some of the fluid passageways in the piston rods.

U.S. Pat. No. 4,691,819, granted Sep. 8, 1987, to Olof A. Hallstrom, and entitled, "Reciprocating Conveyor", discloses tandem drive units having fixed cylinder components at their ends and a movable central piston component. A problem with this drive unit is that it requires the use of a considerable amount of external hoses. In a commercial embodiment, manufactured by Hallco Mfg. Co., Inc. of Tillamook, Oreg., named the Hallco model 4000 conveyor, the cylinder components are of a tie bolt construction and include a manifold at each end. The inward manifolds include some fluid passageways. However, hoses are used to connect the two manifolds at one end of the drive assembly to the two manifolds at the opposite end of the assembly. This construction of the Hallco model 4000 conveyor is disclosed in a Hallco owner's manual that is published by Hallco Mfg. Co., Inc.

Other prior art drive assemblies utilizing tandem linear hydraulic motors are disclosed in U.S. Pat. No. 5,638,943, granted Jun. 17, 1997 to Raymond K. Foster, and entitled "Drive Assembly For Reciprocating Slat Conveyors." FIG. 4 of this patent discloses a drive assembly that is marketed in Europe by Cargo Handling Systems, B.V., located in Coevorden in the Netherlands. This system utilizes passageways in the piston rods in lieu of some of the hoses but continues to use hoses or conduits for connecting the outward ends of the hydraulic drive units with each other and with a main operating valve, or switching valve, and with a directional control valve. The directional control valve, together with other components of the system, adapts the conveyor for both two way loading and unloading.

All of the prior art drive assemblies that utilize tandem drive units also utilize poppet type sequencing valves that are either built into the cylinder components or provided as an auxiliary structure. The aforementioned U.S. Pat. No. 4,821,863 shows sequencing valves that are auxiliary structure. The Hallco Model 4000 conveyors have check valves built into its inner manifolds. These check valves are essentially like the check valves disclosed in U.S. Pat. No. Re. 35,022. Cargo Handling Systems, B.V. builds poppet type sequencing valves into the outward ends of the cylinder components.

Richard T. Gist of Tulare, Calif., has developed a drive assembly for reciprocating slat conveyors which uses spool valves for sequencing in place of poppet type check valves. Portions of the piston rods provide the valve spools. However, this drive assembly continues to require the use of external hoses or pipes.

An object of the present invention is to provide an improved drive assembly in which poppet sequencing valves and external hoses are essentially eliminated. The valve that switches the system between loading and unloading modes is incorporated into a housing that is integrated with a cylinder head forming member. The piston rods and piston rod openings in cylinder head forming members together provide the sequencing valves.

Another object of the invention is to provide a conveyor drive that is simple in construction, is durable in use, is efficient in operation, and can be economically manufactured.

BRIEF SUMMARY

The drive units herein described are elongated in a direction that is parallel to the conveyor slats that are reciprocated by the drive units. In describing the drive units, and the parts thereof, the term "outward" means directed outward in the longitudinal direction. The term "inward"

means extending longitudinally in the direction opposite the outward direction. The terms "first" and "second" are used to identify which of two elements of a kind are being discussed. In describing a linear hydraulic drive unit, for example, either end, or a component at either end (e.g. an outward variable volume working chamber) will be the "first" if it is described first and the other end or like component will be the "second." Most of the time, it makes no difference which end or component is considered to be the "first" and which is considered to be the "second."

A linear hydraulic drive unit of the invention has a first outward variable volume working chamber and a first inward variable volume working chamber at a first end of the drive unit. It also has a second outward variable volume working chamber and a second inward variable volume working chamber at the second end of the unit. A first internal passageway extends from the first outward variable volume working chamber through a first piston head, then through a piston rod, and then through a second piston head to the second inward variable volume working chamber. A second internal passageway extends from the first inward variable volume working chamber, then through the first piston head, then through the piston rod, and then through the second piston head to a second outward variable volume working chamber. The piston rod extends through piston rod receiving openings in a pair of longitudinally spaced apart cylinder heads. Each cylinder head includes an inlet/outlet port, a fluid passageway extending from the inlet/outlet port into the cylinder head, and a chamber port connecting the passageway with the inward variable volume working chamber at its end of the drive unit.

According to an aspect of the invention, the inward variable volume working chamber at one end of the drive unit is connected by an internal passageway with the outward variable volume working chamber at the opposite end of the drive unit. The outward variable volume working chamber at the first end of the drive unit is connected by a different internal passageway to an inward variable volume working chamber at the second end of the drive unit. All fluid pressure flow into and out from each connected together pair of inward and outward variable volume working chambers is via a chamber port that connects the inward variable volume working chamber of the pair with the passageway in the cylinder head, and the inlet/outlet port for such passageway.

According to another aspect of the invention, three tandem linear hydraulic drive units of the type described positioned side-by-side and their cylinder heads are made into a single member that in preferred form is a block of metal that is basically aluminum. The cylinder head forming member or block includes a piston rod receiving opening for each piston rod. A manifold passageway in the piston head forming member extends from the inlet/outlet port, first to one side of the closest piston rod receiving opening, and then from an opposite side of the same piston rod receiving opening to the near side of the next piston rod receiving opening, for the middle piston rod, and then from an opposite side region of the piston rod receiving opening for the middle piston rod, onto a chamber port for the third drive unit. According to this aspect of the invention, the piston rod receiving opening and the piston rod together form a spool valve that either permits or blocks fluid pressure flow in the manifold passageway across the piston rod receiving opening in the cylinder head forming member.

According to another aspect of the invention, a cylinder head member is provided which includes internally threaded sockets, one for each cylinder tube, entering into the cylinder head on the side thereof opposite the cylinder tubes. A metal sleeve is provided for each piston rod. Each metal sleeve has an externally threaded nipple that threads into a threaded socket. The sleeve includes an internal girth groove in which a seal ring is received, for sealing around the piston rod, between it and the interior of the sleeve. In preferred form, each cylinder head is made from a metal that is primarily aluminum. The sleeve is made from a structurally stronger metal, such as a metal that is basically steel. In preferred form, the sleeve includes a second internal girth groove in which a wear ring is received. The wear ring surrounds the piston rod and contacts the outer surface of the piston rod when the piston rod reciprocates back and forth during use. In preferred form, each sleeve also includes another internal groove at its inward end in which a dirt seal is received. Each sleeve is secured to the cylinder head forming member and its wear ring makes most of the wear contact with the piston rod. In preferred form, the portion of the cylinder head forming member that is between the sleeve and the inward variable volume working chamber is what functions as a spool valve together with the piston rod, the piston rod receiving opening in the cylinder head, and the passageway in the cylinder head that intersects the piston rod receiving opening.

Another aspect of the invention is to provide a drive unit having at least one cylinder head forming member that includes an internally threaded socket for receiving an externally threaded inward end portion of a cylinder tube. This connection of the inward end of the cylinder tube with the cylinder head provides an inward end closure for the space that is defined in and by the cylinder tube. The outer end of the cylinder tube may be threaded (e.g. internally) to receive a threaded (e.g. externally) nipple on an end cap. Or, the outward end of the space formed in and by the cylinder tube may be closed in some other manner. The threaded connection is preferred, particularly when the inward end of the cylinder tube is thread connected to the cylinder head, so that tie bolts or the like are unnecessary.

These and other advantages, objects, and features will become apparent from the following best mode description, the accompanying drawings, and the claims, which are all incorporated herein as part of the disclosure of the invention.

BRIEF DESCRIPTION OF THE DRAWINGS

In the drawings, like reference numerals and letters refer to like parts throughout the several views and:

FIG. 2 is a top plan view of the drive assembly shown by FIG. 1;

FIG. 3 is a sectional view taken substantially along line 3—3 of FIG. 2;

FIG. 4 is a bottom plan view of the drive assembly shown by FIGS. 1–3, with opposite end portions of the transverse drive beams omitted;

FIG. 8 is an enlarged scale pictorial view of the portion of FIG. 5 between the right end cylinder head member and the piston rods;

FIG. 9 is an enlarged scale exploded pictorial view of the portion of FIG. 5 that includes the piston rods and the components between the piston rods and the left end cylinder head member;

FIG. 10 is an enlarged scale pictorial view of the right end cylinder head member and the valve components below it, in FIG. 5;

FIG. 12 is an enlarged scale longitudinal sectional view of one of the left end cylinder assemblies in FIG. 5;

FIG. 13 is a cross sectional view taken substantially along line 13—13 of FIG. 12;

FIG. 14 is a cross sectional view taken substantially along line 14—14 of FIG. 12;

FIG. 15 is a right side up cross sectional view taken substantially along line 15—15 of FIG. 4;

FIG. 22 shows all three piston components at a fully advanced position;

FIG. 23 shows the first piston component retracting while the second and third piston components are at rest at the advanced position;

FIG. 24 shows the first piston component at rest at a retracted position, shows the second piston component retracting and shows the third piston component at rest at an extended position;

FIG. 25 shows all three piston components in retracted positions;

FIG. 26 shows all three piston components moving together towards the front of the conveyor, for loading a load;

FIG. 27 shows all three piston components at rest at a fully advanced position;

FIG. 28 shows the third piston component retracting and the first and second piston components at rest in the advanced position;

FIG. 29 shows the third piston rod component at rest in a retracted position, the second piston component retracting and the third piston component at rest in a fully advanced position;

FIG. 30 shows the first piston component retracting and the second and third piston components at rest in a fully retracted position;

BEST MODE FOR CARRYING OUT THE INVENTION

Figure 1:
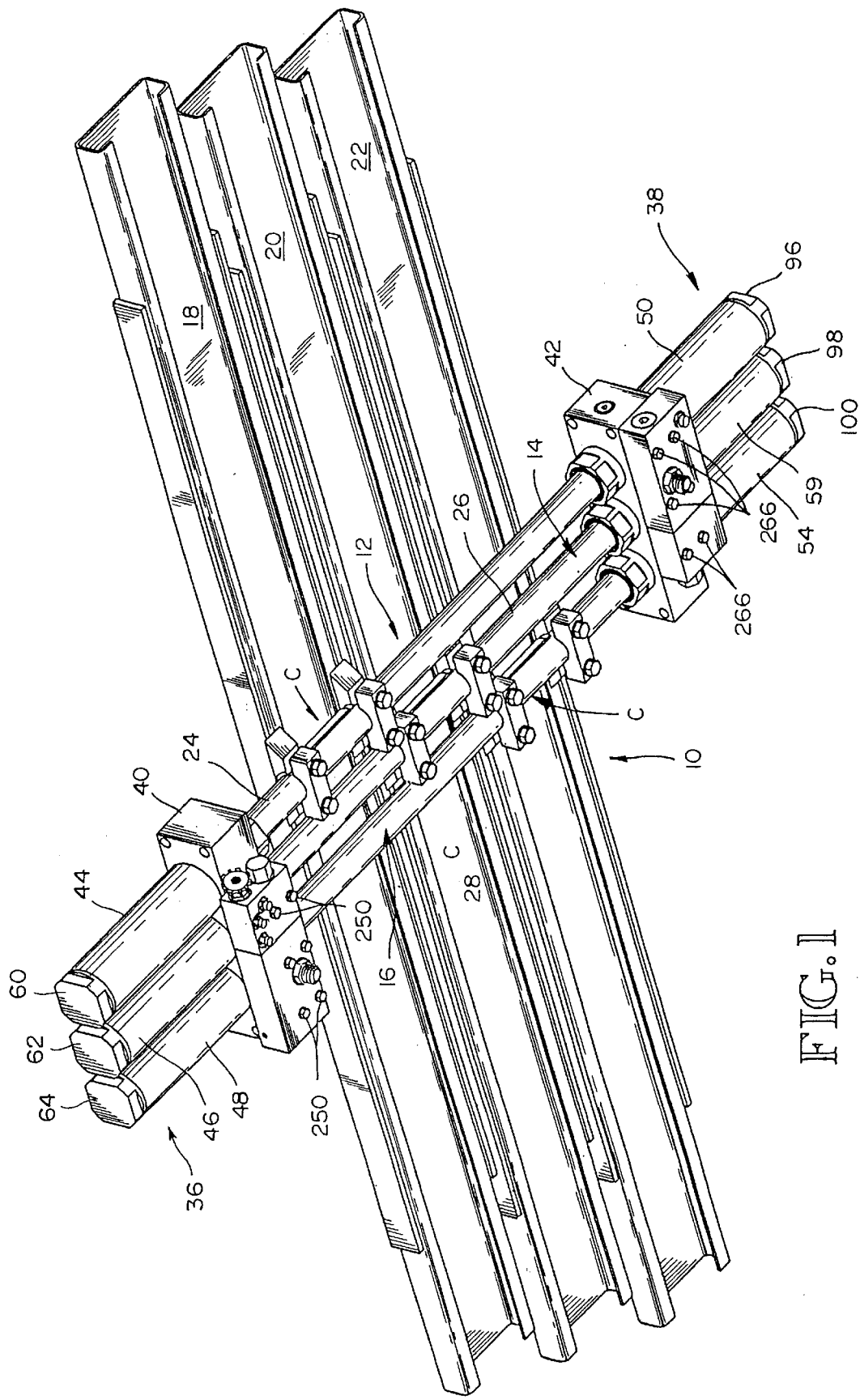
FIG. 1 is a pictorial view of a drive assembly for a reciprocating slat conveyor, looking from below towards one end, the bottom and one side of the assembly.

The principles that constitute the present invention can best be understood by considering an embodiment of the invention and in particular the best mode of the invention that is shown by the drawing.

Referring first to FIG. 1, a drive assembly 10 embodying the present invention is shown to comprise three hydraulic drive units 12, 14, 16. Each drive unit 12, 14, 16 has fixed opposite end portions and a movable center portion. The end portions are secured to frame structure in some suitable manner and the movable center portions are connected to transverse drive beams 18, 20, 22. Preferably, the transverse drive beams 18, 20, 22 are connected to the drive units by use of the connection structure C that is disclosed in my co-pending application Ser. No. 09/322,271, filed May 28, 1999, and entitled "Drive Beam to Drive Unit Connections."

In the preferred embodiment, transverse drive beam 18 is connected to piston rod 24 for drive unit 12. Transverse drive beam 20 is connected to piston rod 26 for drive unit 14. Transverse drive beam 22 is connected to piston rod 28 for drive unit 16. Referring to FIG. 2, a top plan view, transverse drive beam 18 is provided with a plurality of connectors 30, one for each conveyor slat that is connected to the drive beam 18. In like fashion, transverse drive beam 20 is provided with a plurality of conveyor slat connectors 32 and transverse drive beam 22 is provided with a plurality of conveyor slat connectors 34.

As is well known to persons skilled in the art, conveyor slats are connected to the connectors 30, 32, 34, such as in the manner shown by U.S. Pat. No. 4,492,303, granted Jan. 8, 1985 to Raymond Keith Foster, and entitled "Drive/Guide System For A Reciprocating Floor Conveyor". As also shown in that patent, the conveyor slats are supported on and by self lubricated plastic bearings which are themselves supported by longitudinal support beams, shown in that patent in the form of square tubes.

The drive units 12, 14, 16 are tandem drive units, composed of piston components and cylinder components. The piston components include the piston rods 24, 26, 28, and piston heads to be described later, at both ends of the piston rods 24, 26, 28. The cylinder components are preferably provided by a pair of cylinder tube assemblies 36, 38, one at each end of the drive assembly 10. In the illustrated embodiment, each cylinder tube assembly includes a cylinder head forming member 40, 42 and a plurality of cylinder tubes 44, 46, 48, and 50, 52, 54, one for each drive unit.

The cylinder tube assemblies 36, 32 are secured in any suitable manner to a frame structure that might be a portion of the drive assembly 10, and used for mounting the drive assembly 10 in an installation frame. Or, the cylinder tube assemblies 36, 38 may be directly connected to an installation frame. By way of typical and therefore non limitive example, several forms of a mounting frame for the drive assembly is shown by the aforementioned U.S. Pat. No. 5,638,943 (FIGS. 1, 2 and 5–12).

Figure 5:
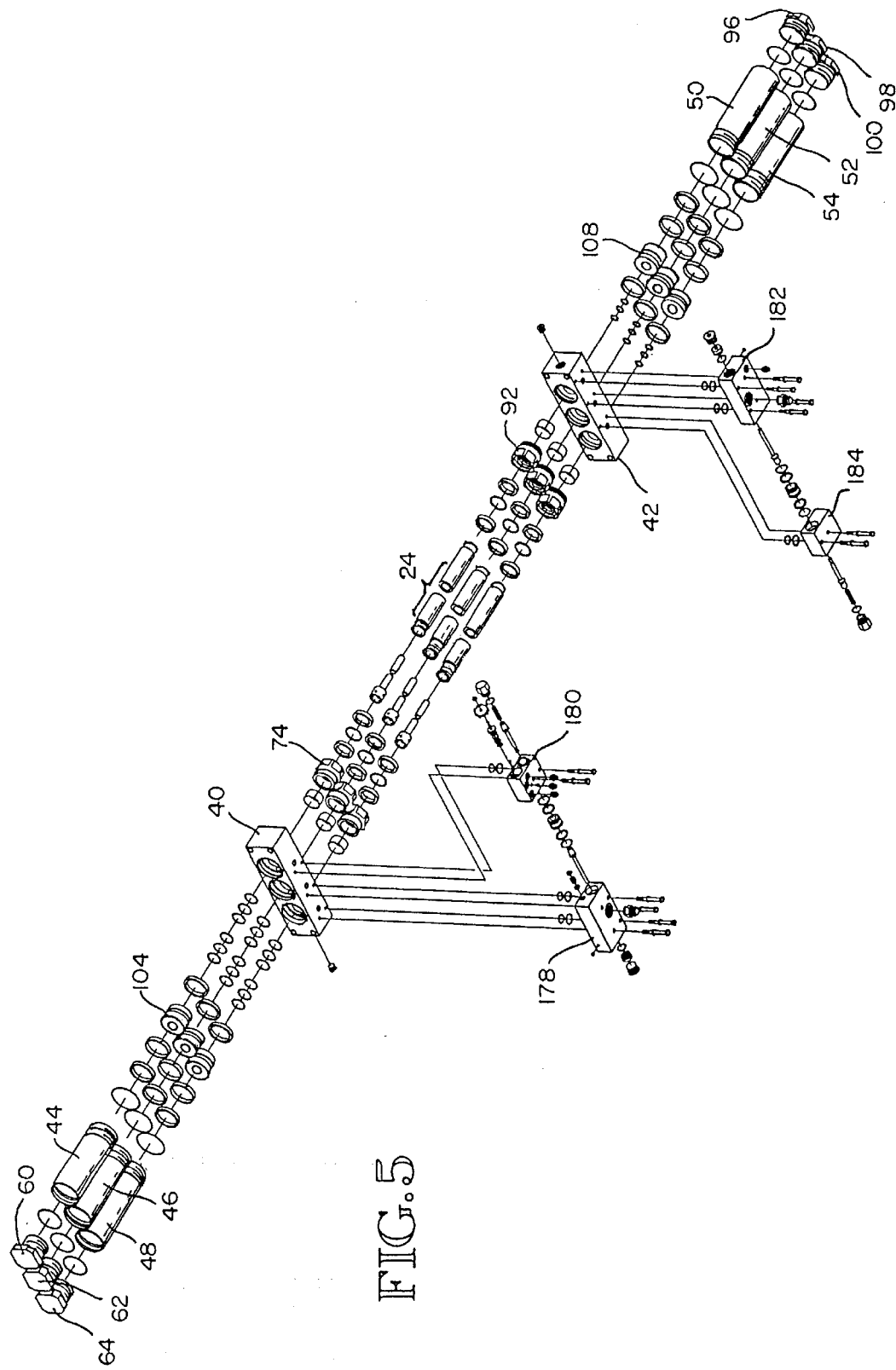
FIG. 5 is an exploded pictorial view of the components of the drive assembly shown by FIGS. 1–4, minus the transverse drive beam, the center portions of the piston rods and the connectors for connecting the transverse drive beams to the piston rods.

FIG. 5 herein is an exploded pictorial view of most of the components that in combination make up the drive units 12, 14, 16. The primary purpose of FIG. 5 is to orient the enlarged scale fragmentary portions of FIG. 5 that are shown by FIGS. 6–11. For that purpose, very few reference numerals are used in FIG. 5. Primarily, the components appearing at the ends of FIGS. 6–11 are provided with reference numerals in FIG. 5. Cylinder head members 40, 42 appear in most of the views. This is done to further provide a way of orienting FIGS. 6–11 to FIG. 5 and to each other.

Figure 6:
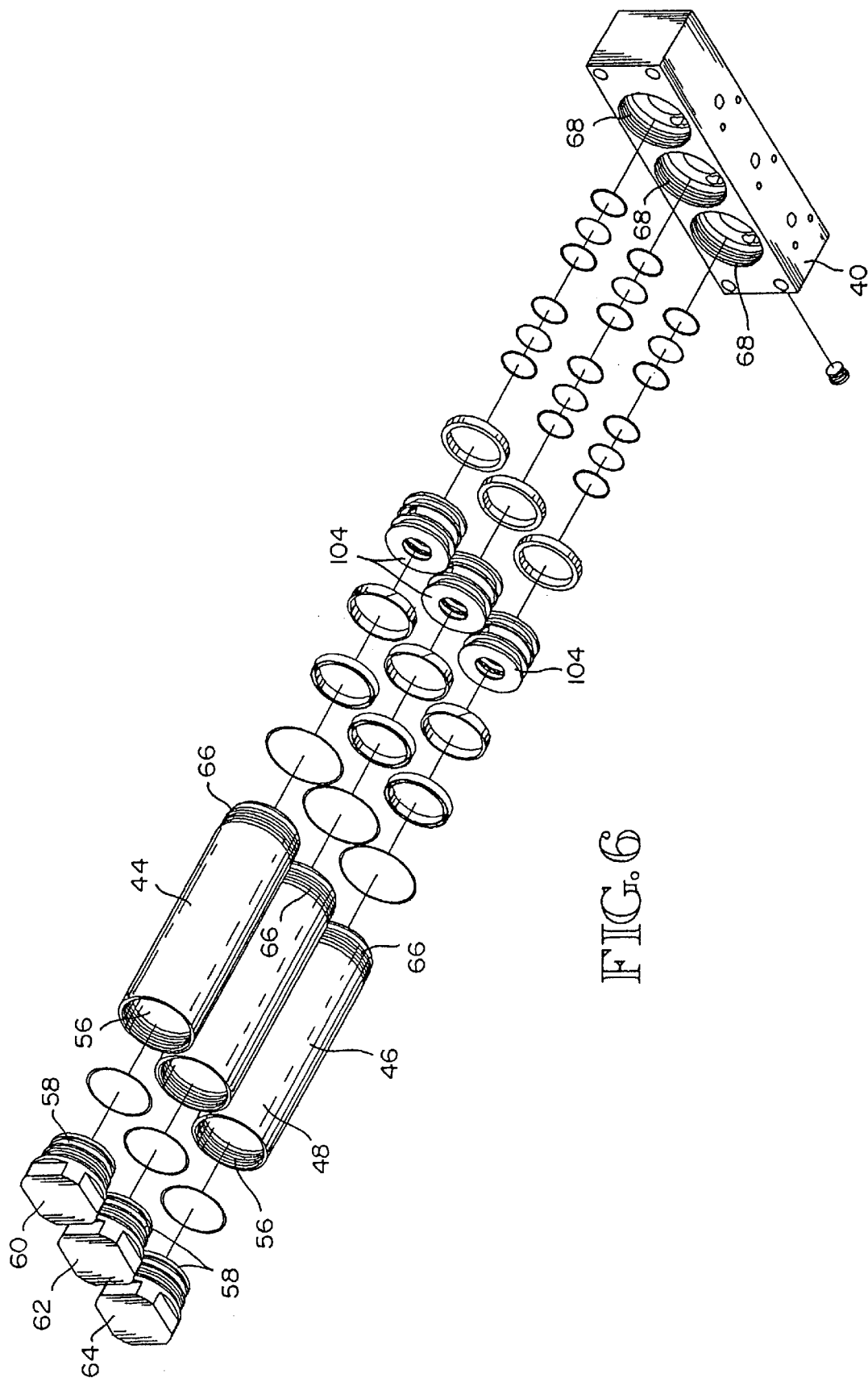
FIG. 6 is an enlarged scale exploded pictorial view of the left end portion of FIG. 5.

The drawings all form a part of the description of the invention. FIGS. 5–11 show parts that are readily identifiable and for that reason do not need to be described. Also, the figures of the drawing constitute schematic diagrams for the principles that are exemplified by the structure that is illustrated and described. Accordingly, when studying the drawings and reading this document it should be kept in mind that the components that are shown and described by way of example also represent other components that exist that are equivalent for performing the same function as the illustrated part. Referring to FIG. 6, the cylinder tubes 44, 46, 48 may have threads at each end. The threads at the outward ends of the cylinder tubes 44, 46, 48 are designated 56. They are preferably internal threads adapted to receive threaded endward end portions 58 of end cap members 60, 62, 64. End cap members 60, 62, 64 provide outward end wall for the inner spaces in the cylinder tubes 44, 46, 48. O-rings may be provided to seal between the threads 56, 58.

Figure 7:
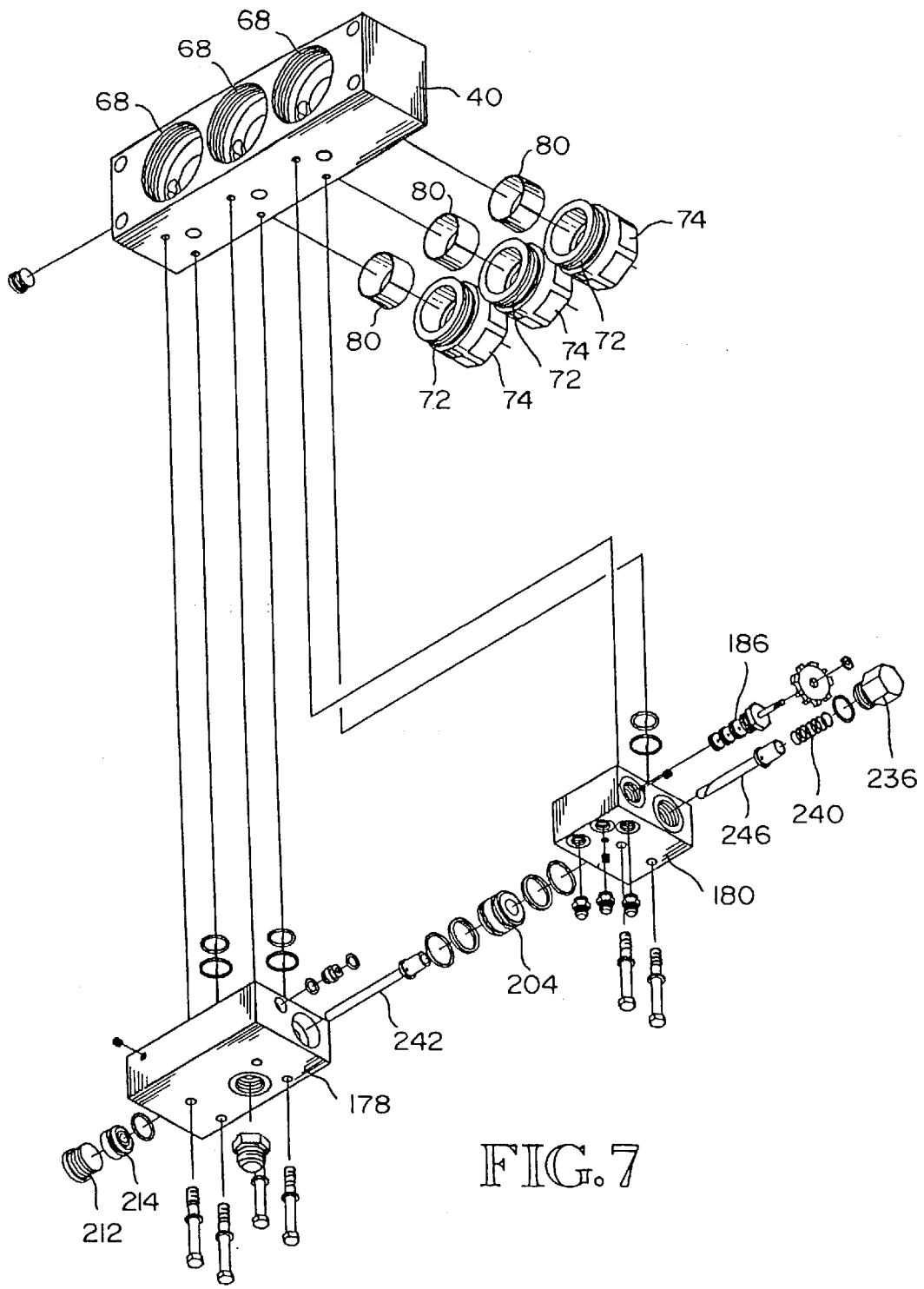
FIG. 7 is an enlarged scale exploded pictorial view of the left end cylinder head member and the valve components below it, shown in FIG. 5.

The inward ends of cylinder tubes 44, 46, 48 may be externally threaded at 66. This is so that they can screw into internally threaded sockets 68 formed in cylinder head member 40. O-rings may be provided to seal between the mating threads 66, 68, as illustrated. Opposite the internally threaded sockets 68, the cylinder head forming member 40 may include smaller diameter, internally threaded sockets 70 (FIG. 12) sized to receive externally threaded nipples 72 on sleeves 74. In a preferred embodiment, the cylinder head forming members 40, 42 are made from a metal that is primarily aluminum. The sleeves 74 are made from a metal that is primarily steel or some other metal that is structurally stronger that aluminum. O-rings are provided to seal between the threads 70 and the threads 72. As best shown by FIG. 12, each sleeve 74 includes an inner groove 76 for receiving a seal ring. Preferably it also includes a second inner groove 78 for receiving a wear ring 80 (FIG. 7). Preferably also, it includes a third internal groove 82 for receiving a dirt seal. As shown by FIG. 12, the sleeve 74 is threaded into the threaded socket 70 with an O-ring seal in the space 84. The O-ring seal 84 seals between the sleeve 74 and the cylinder head forming member 70. The seal within space 76 seals between sleeve 74 and the shaft. In FIG. 12, the shaft that is shown is shaft 24.

Figure 11:
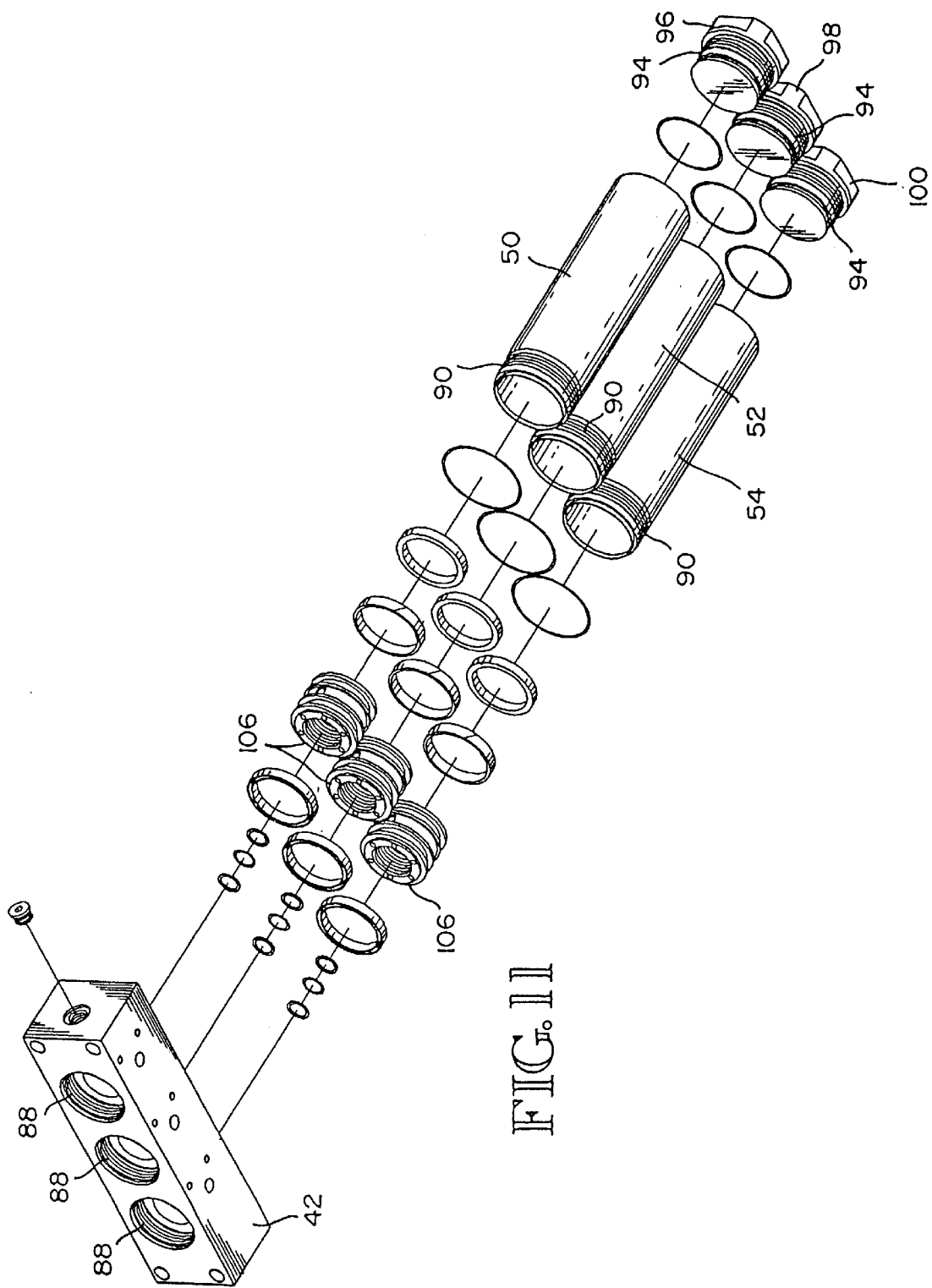
FIG. 11 is an enlarged scale pictorial view of the right end cylinder head member and the remaining components of the assembly that are positioned to the right of the right end cylinder head member.
Figure 16:
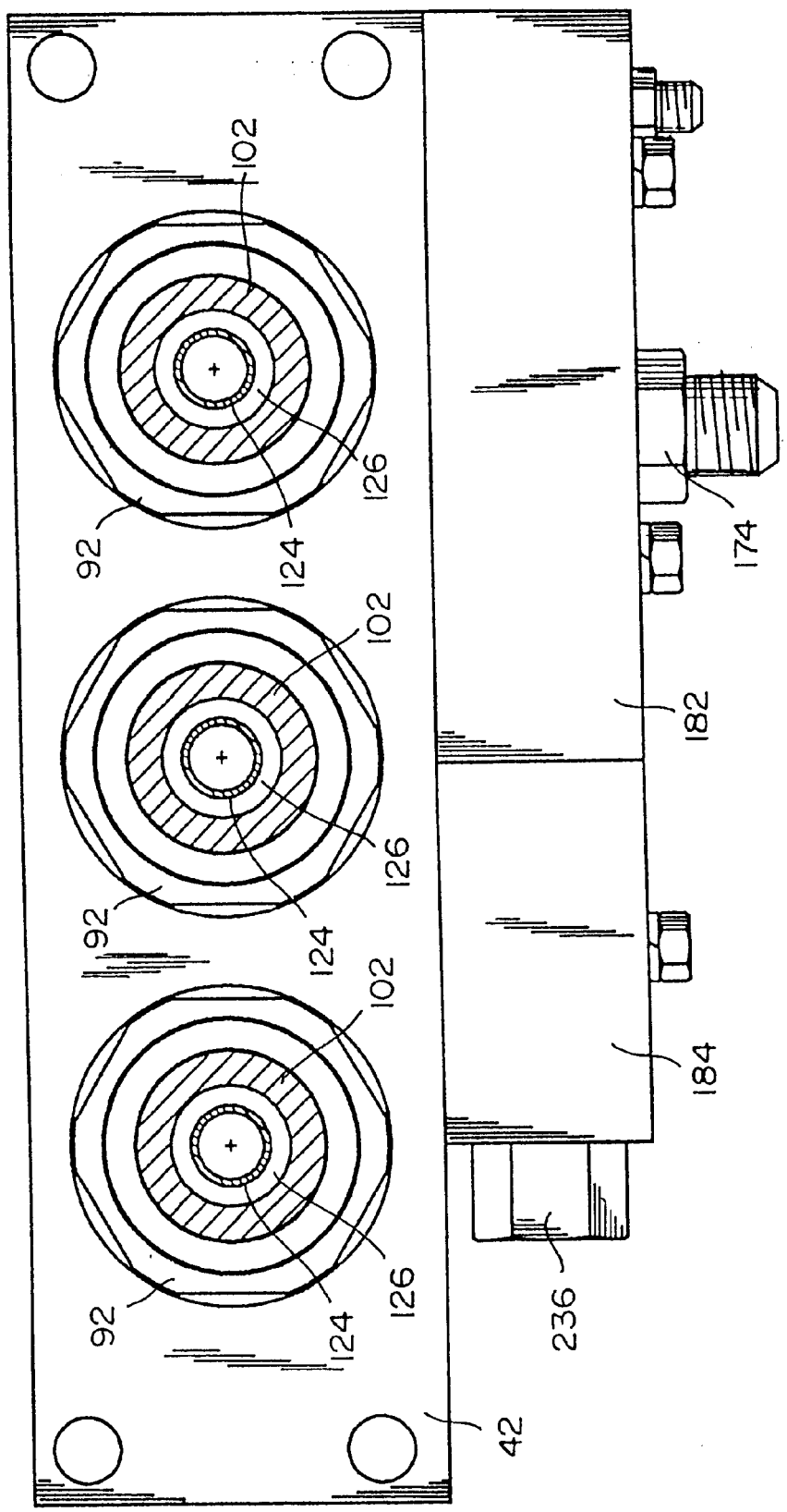
FIG. 16 is a right side up cross sectional view taken substantially along line 16—16 of FIG. 4.

Referring to FIGS. 8 and 11, cylinder head forming member 42 also includes internally threaded sockets 88 for receiving externally threaded nipples 90 on sleeves 92. Sleeves 92 may be identical to sleeves 74. Cylinder head members 40, 42 may be constructed from the same material and sleeves 74, 92 may be constructed from the same material.

Figure 18:
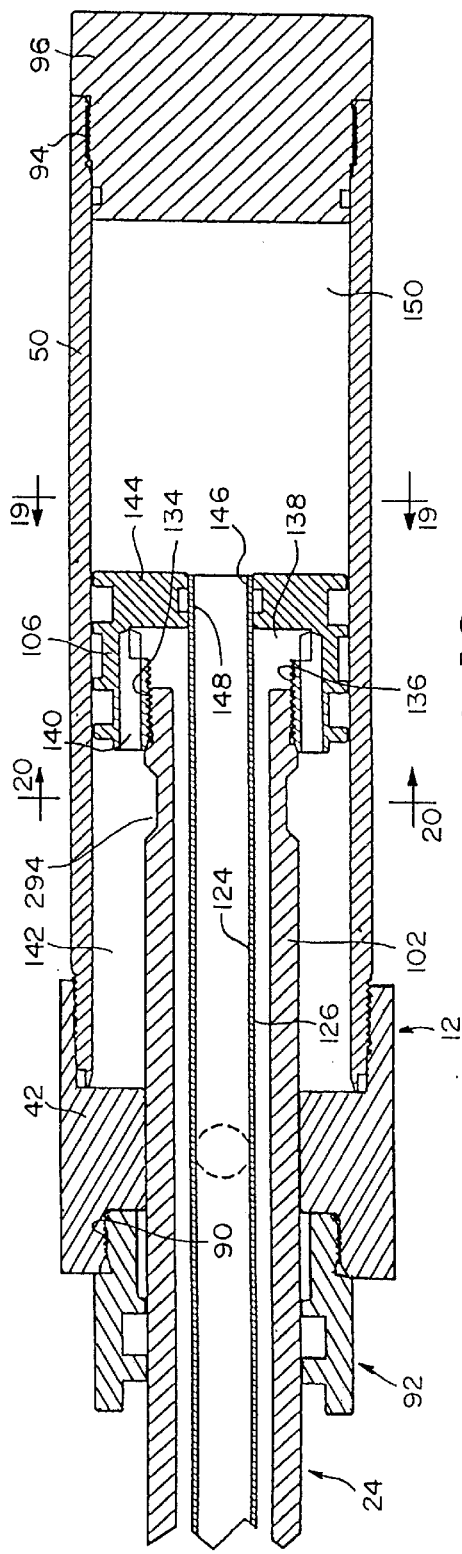
FIG. 18 is a longitudinal sectional view taken through the end portion of a drive unit at the end of the assembly opposite from the end that includes the end portion shown by FIG. 12.
Figure 19:
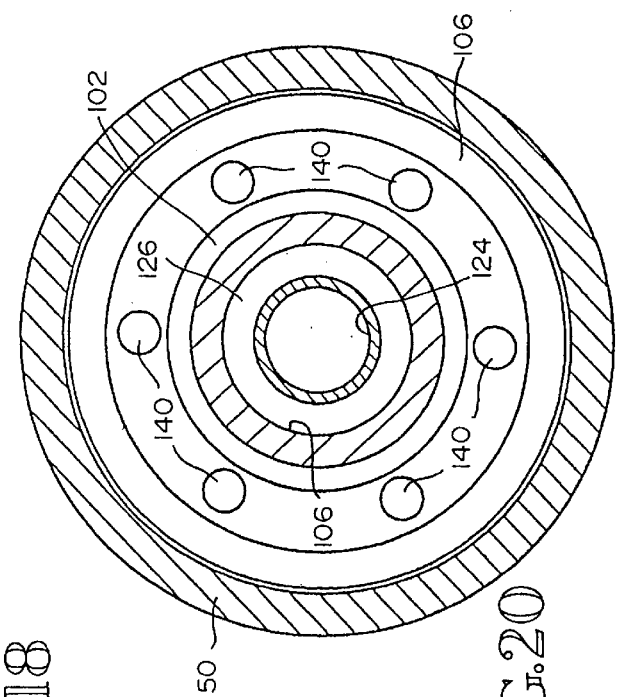
FIG. 19 is a cross sectional view taken substantially along line 19—19 of FIG. 18.
Figure 20:
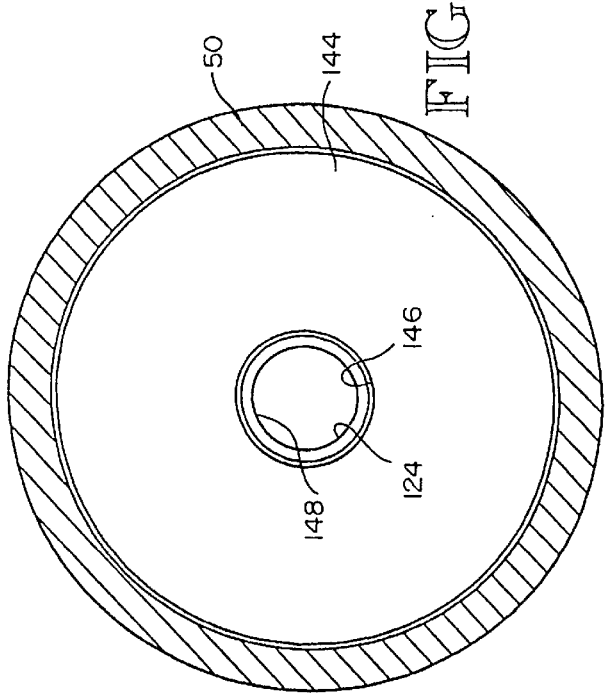
FIG. 20 is a cross sectional view taken substantially along line 20—20 of FIG. 12.

Referring to FIG. 11, the cylinder head member 42 includes sockets on the side of it opposite sockets 88 that are provided for receiving the externally threaded inward ends 90 of the cylinder tubes 50, 52, 54. As best shown by FIG. 18, O-rings are inserted over and about the threads 90 and then the threads are inserted into the sockets 92 and the cylinder tubes 50, 52, 54 are rotated to thread them into the sockets 90. The O-rings are compressed so that it seals against leakage at the threads. The outward ends of the cylinder tubes 50, 52, 54 preferably have internal threads for receiving external threads on nipples 94 that are apart of caps or plugs 96, 98, 100. O-rings are preferably positioned on the nipples 94 and then the nipples 94 are inserted into the threaded openings in the outward ends of the cylinder tubes 50, 52, 54. Then the caps are rotated to thread them into the cylinder tubes 50, 52, 54. When the end plugs 96, 98, 100 are tightened, the O-ring is compressed and it serves to seal against leakage at the threads.

The piston component construction will now be described, primarily in conjunction with FIGS. 12–13 and 18–30, but with some reference to FIGS. 5, 6, 8 and 9. Referring first to FIGS. 12–14 and 18–20, these figures show all of drive unit 12 except for the central portion of the piston rod 24. FIGS. 1–4 show the full length of the drive unit assembly. The central portion of the piston rod 24 that is omitted from FIGS. 12 and 18 is like the portion of piston rod 24 that is shown in FIGS. 12 and 18, where it passes through the cylinder head forming members 40, 42 and the sleeves 74, 92.

All three drive units 12, 14, 16 are alike so it is only necessary to illustrate one of them. Drive unit 12 was selected for illustration. It is drive unit 12 that is shown in FIGS. 12–14 and 18–20. Piston rod 24 has a tubular body 102 that extends from a connection with piston head 104 within cylinder tube 44 to a connection with a piston head 106 within cylinder tube 50. Piston rod body 102 has a substantially constant diameter center passageway 106. The end of piston rod body 102 that is connected to piston head 104 is preferably externally threaded at 108. The piston head 104 includes a socket having complementary internal threads 110. An O-ring is positioned between the piston head 104 and the end portion 108 and then the piston head 104 is threaded onto the end portion 108.

Piston head 104 has a somewhat annular outer portion 112 and a somewhat cylindrical inner portion 114. O-rings are positioned in the O-ring grooves that are illustrated and then the annular portion 116 is connected to the cylindrical portion 114. The annular portion 112 is formed to include a plurality of axial passageways 116. There are six passageways 116 in the illustrated embodiment (FIG. 14). Radial passageways 118 in member 112 are in alignment with radial passageways 120 in member 114. The inner ends of passageways 120 meet at a center space 122.

Piston rod 24 is provided with a center tube 124 that extends through the passageway 106 of member 102 from piston head 104 to piston head 106 (FIGS. 12 and 18). Piston head 102 has an increased diameter socket portion adjacent the space 122. An end portion of tube 124 fits snugly within this socket. An annular passageway 126 is formed by and between the tubular members 102, 124. Center portion 114 of piston head 104 includes a plurality of axial ports 128. These ports 128 communicate the outer variable volume working chamber 130 with the annular passageway 126 (FIG. 12). The radial ports 118 and the axial ports 116 communicate the interior of tube 124 with the inward variable volume working chamber 132. The piston head 104 divides the space within the cylinder tube 44 into an outer variable volume working chamber 130 and an inner variable volume working chamber 132.

As shown by FIG. 12, the piston head 104 preferably has three girth grooves surrounding it. The two end grooves receive seals rings. The center groove receives a wear ring.

At the opposite end of the piston rod 24, the threaded end portion 134 of the piston rod member 102 engages internal threads 136 formed in an axial socket formed in the piston head 106. The interior of this socket 138 communicates with a plurality of axial ports 140. These axial ports 140 communicate the socket 138 with the inward variable volume working chamber 142. The outward end 144 of the piston head 106 is a radial wall 144 that is formed to include a circular center opening 140. The right end portion 148 of the tube 124 fits snugly within the opening 146. A seal ring groove is shown formed in member 144, positioned to receive a seal ring that surrounds the tube 124. There is fluid communication between the inside of tube 124 and the outward variable volume working chamber 150.

Looking at FIGS. 12 and 18 together, fluid pressure in inward working chamber 132 is communicated via the ports 116, and 120, and center cavity 122, in piston head 104, with the outward working chamber 150, via the interior of tube 124. In similar fashion, the outward working chamber 130 is communicated with the inward working chamber 142 via ports 128 in piston head 104, via annular passageway 126 in the piston rod 24, and via the center cavity 138 and the ports 140 in piston head 106.

Figure 31:
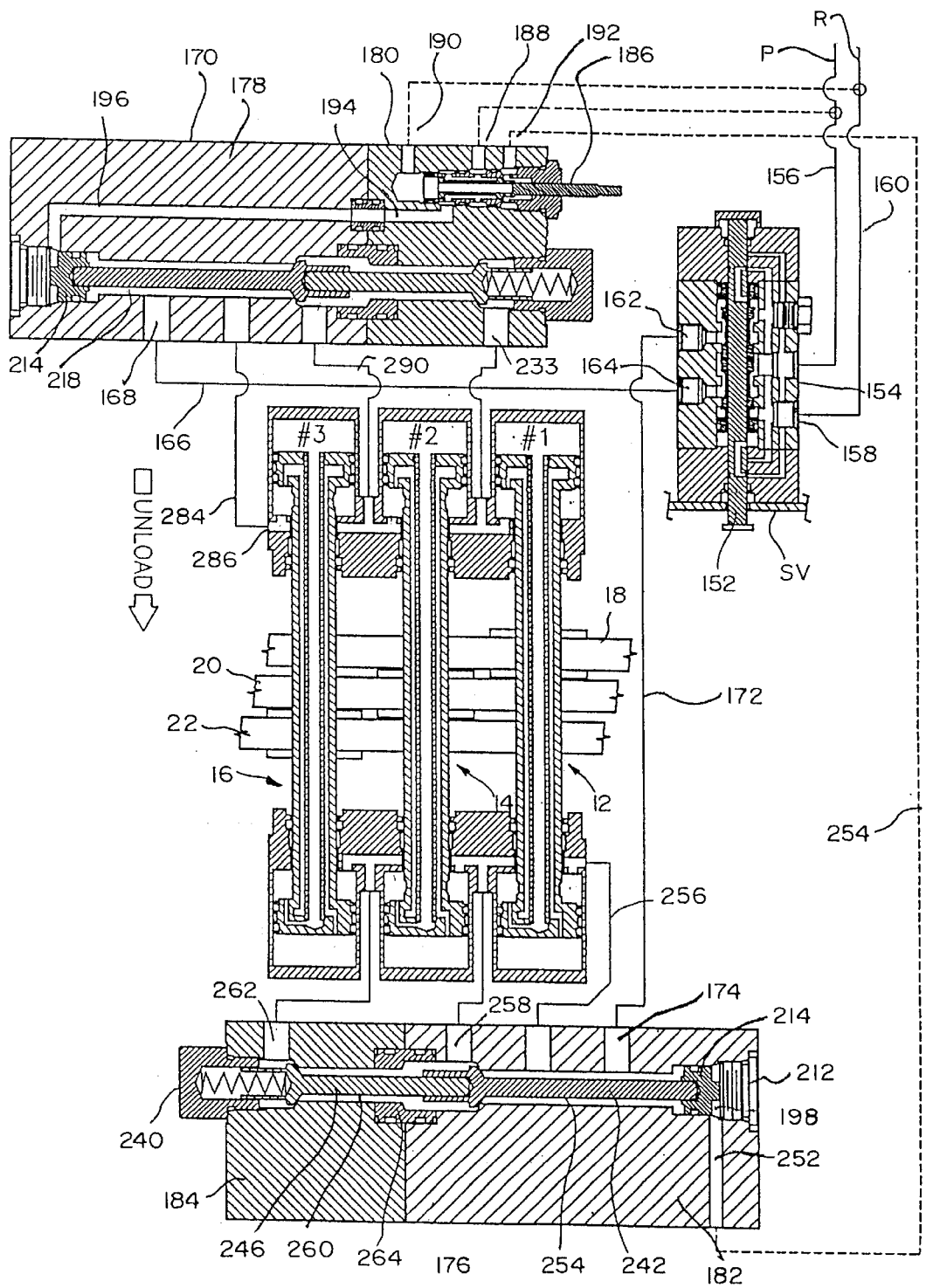
FIG. 31 is a schematic diagram of the entire system, with the direction control valves positioned for causing an unloading movement of the conveyor slats.
Figure 32:
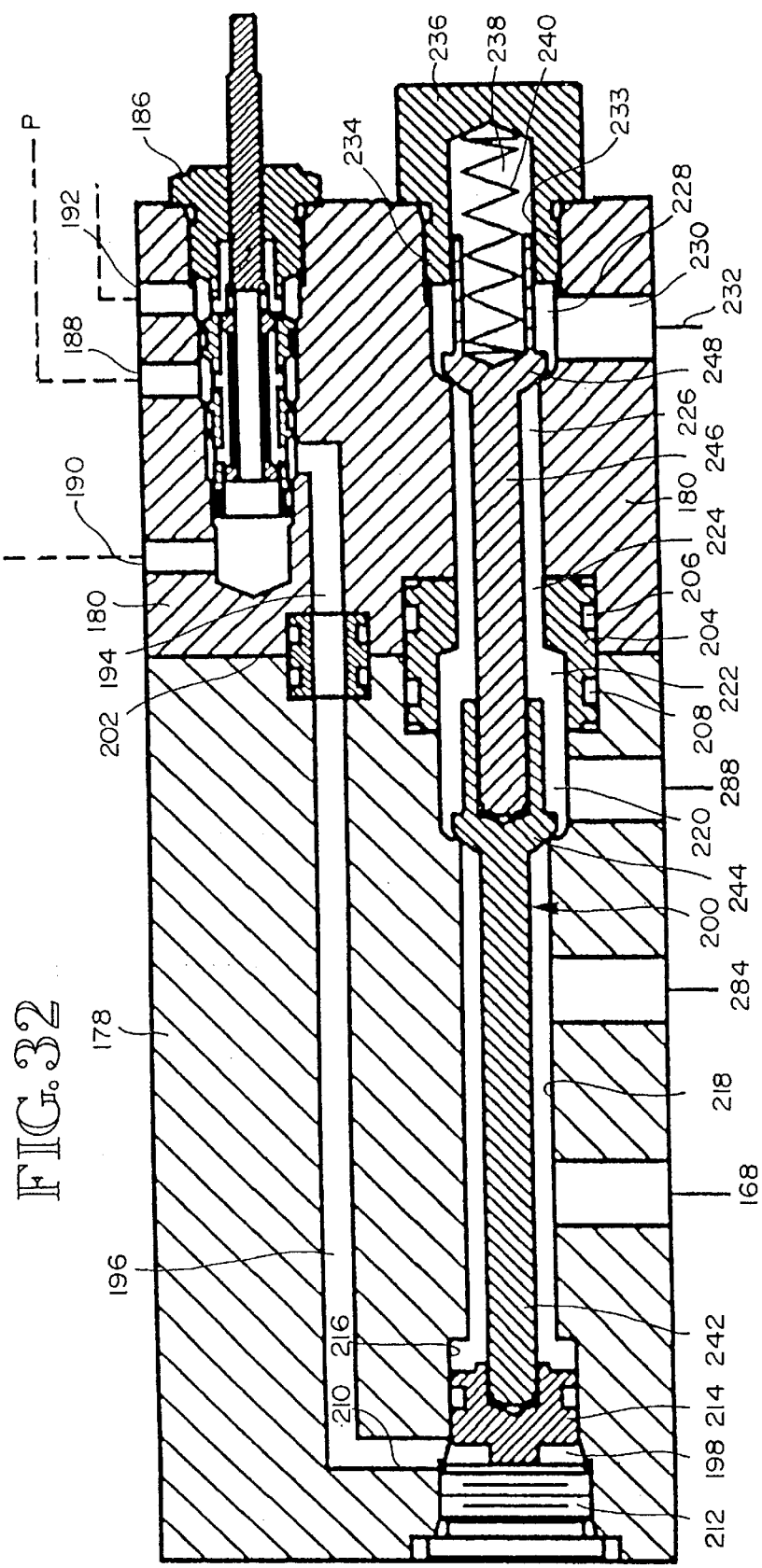
FIG. 32 is an enlarged scale view of the valve assembly shown at the upper left portion of FIG. 31.

Referring to FIGS. 31 and 32, the switching valve SV is preferably like the switching valve disclosed in U.S. Pat. No. 5,103,866, granted Apr. 14, 1992, to Raymond Keith Foster, and entitled, "Poppet Valve An Valve Assemblies Utilizing Same". However, any suitable four-way switching valve may be employed. The control rod 152 may be moved in the manner disclosed in U.S. Pat. No. 5,103,866 (FIGS. 7–10). Contact with transverse drive beam 18 moves the control rod 152 in one direction. Contact with transverse drive beam 22 moves it in the opposite direction. The switching valve SV includes a pressure port 154 that is connected to a pressure supply conduit 156 that extends from a source of fluid pressure, e.g. a pump P. Valve SV also includes a return port 158 that is connected to a return line 160 that returns hydraulic fluid to a tank. Switching valve SV also includes two cylinder ports 162, 164. A conduit 166 extends from port 164 to a port 168 in valve housing 170. Cylinder port 162 is connected to a conduit 172 that extends to a port 174 in a second valve housing 176.

Valve housing 170 is preferably of two part construction. It includes a first portion 178 and a second portion 180. Valve housing portions 178, 180 are secured to cylinder head forming member 40, as shown in FIGS. 1–3, 3–5, 7 and 15. In similar fashion, valve housing 176 is of two part construction. It includes a first part 182 and a second part 184. Both are connected to cylinder head forming member 42, as shown in FIGS. 1, 2–5, 10, 16, 17 and 17A.

Housings 170, 176 house valve components that together form a direction-of-conveying valve, i.e. a load/unload valve. This valve is controlled by a four-way valve 186 that is housed in housing part 180. It is a type of four-way control valve that includes a first port 188 connected to the pressure line 156 and a second port 190 connected to return line 160. A suitable valve 186 is valve SV08-40 0-N-12D6, manufactured by Hydroforce Hydraulics Ltd. of Burmingham B6 5RX England. This valve is solenoid operated and so it can be. remotely operated. When in a first position it connects a port 194 to pressure and a port 192 to return. When it is second position, it connects port 192 to return and port 194 to pressure.

As best shown by FIG. 32, a passageway 196 in housing member 178 extends from port 194 to a pilot chamber 198 at the outer end of a valve assembly 200. As should be readily apparent, the valve spool assembly 200 is constructed in a manner facilitating installation into and removal from the valve housing portions 178, 180. Valve assembly 200 includes an elongated valve spool cavity that has a portion 218 in housing portion 178 and a portion 226 in housing portion 180.

Opposing sockets are formed in the housing parts 178, 180 where port 194 joins passageway 196. A splice tube 202 has one end in one socket and a second end in the other socket. Member 102 carries two surrounding O-rings, one for sealing between member 202 and the socket in part 180, and the other for sealing between member 202 and the socket in member 178. In similar fashion, a pair of opposing sockets are formed in the members 178, 180 where the four portions 218, 220, 224, 226 of the valve spool cavity meet. A splice tube 204 has a first end that fits snugly in a first of these sockets and a second end that fits snugly in the other of the sockets. Member 204 like member 202 carries two O-rings. An O-ring in O-ring groove 206 seals between member 204 and housing part 180. An O-ring in O-ring groove 208 seals between member 204 and housing part 178.

An opening 210 is formed in the left end (as pictured) of housing part 178. It receives a closure plug 212. An O-ring is provided between the plug 212 and the opening 210, for sealing against fluid leakage at this location. The valve plug assembly includes a two position piston 214 that reciprocates within a first region 216 of the valve plug cavity. Piston 214 includes a surrounding O-ring groove in which an O-ring is received, for sealing between piston 214 and the sidewall of cavity 216. An elongated cylindrical bore 218 extends from cavity 216 over to a second cavity 220. Cavity 220 communicates with a cavity 222 in splice tube 204. Cavity 222 communicates with a passageway section 224 in splice tube 204. Passageway section 224 communicates with a passageway section 226 in housing part 180. Housing part 180 includes a cavity 228 that communicates with passageway section 226 and a port 230 to which a port 232 is connected. Internally threaded socket opening is formed in an adjacent portion of housing part 180. Socket 233 receives an externally threaded nipple 234 that is a part of a closure plug 236. Closure plug 236 includes an internal cavity 238 in which one end of a spring 240 is received.

The valve plug member is constructed in sections. It includes the piston 214, a first rod portion 242, a poppet portion 246 having a valve seat contacting surface on one end and a socket at its opposite end. An end portion of a second rod section 246 is received within the socket. Rod section 246 includes a poppet head portion 248 that includes a valve seat contacting surface on one side an a socket portion on its other side. This socket portion receives the second end of spring 240. Spring 240 biases the valve spool member to the left, as illustrated in FIG. 32. It pushes the valve seat contacting surface on valve plug section 248 against a valve seat that is formed where passageway 226 meets cavity 228. The valve spool section 246 exerts an endwise force on valve spool section 242, pushing piston 214 against plug 212. Spring 240 also biases the valve seat contacting surface of valve plug 244 against a valve seat that is formed where passageway 218 intersects cavity 220.

Valve plug section 242 is inserted into the passageway 218 via the cavity 220. Then, the spliced members 202, 20 are inserted in the sockets formed for them in the housing parts 178, 180 and the housing parts 178, 180 are moved together. Then, piston 218 is inserted through opening 210 and the plug 212 is screwed into place. At the opposite end of the assembly, valve spool section 246 is inserted into passageway 228 via cavity 228. Then, the spring 240 and the closure plug 236 are installed. Also, the valve 186 is installed by screwing it into a threaded opening that is formed in housing part 180 to receive it. Thus assembled, the housing parts 178, 180 are attached to the cylinder head forming member 40, such as by use of bolts 250 (FIG. 1).

Valve housing 176 is constructed much like valve housing 170 except that it does not include a control valve 186. Because of the common construction, it will not be described in as much detail as valve housing 170. The pilot chamber formed between the piston 214 and the plug 212 is connected to a port 252. A hose or pipe 254 extends from port 192 in valve housing 170 to port 252 in valve housing 176. When control valve 182 is positioned such that the pressure port 188 is connected with pressure port 192, there will be pressure in conduit 254 and in port 252, and in the chamber between the plug 212 and the piston 214. This pressure will move the valve plug assembly to the left, compressing the spring 240. This movement of the valve plug assembly 242, 246 will communicate passageway 172. with passageways 256, 258, 262.

Housing parts 182, 184 include opposing sockets for receiving opposite end pieces of a splice tube 264. Splice tube 264 includes O-ring grooves in its interior for receiving O-rings that seal between it and the housing parts 182, 184. The assembled together housing parts 182, 184 are connected to the head forming member 42, such as by the use of bolts 266 (FIG. 1).

Figure 17:
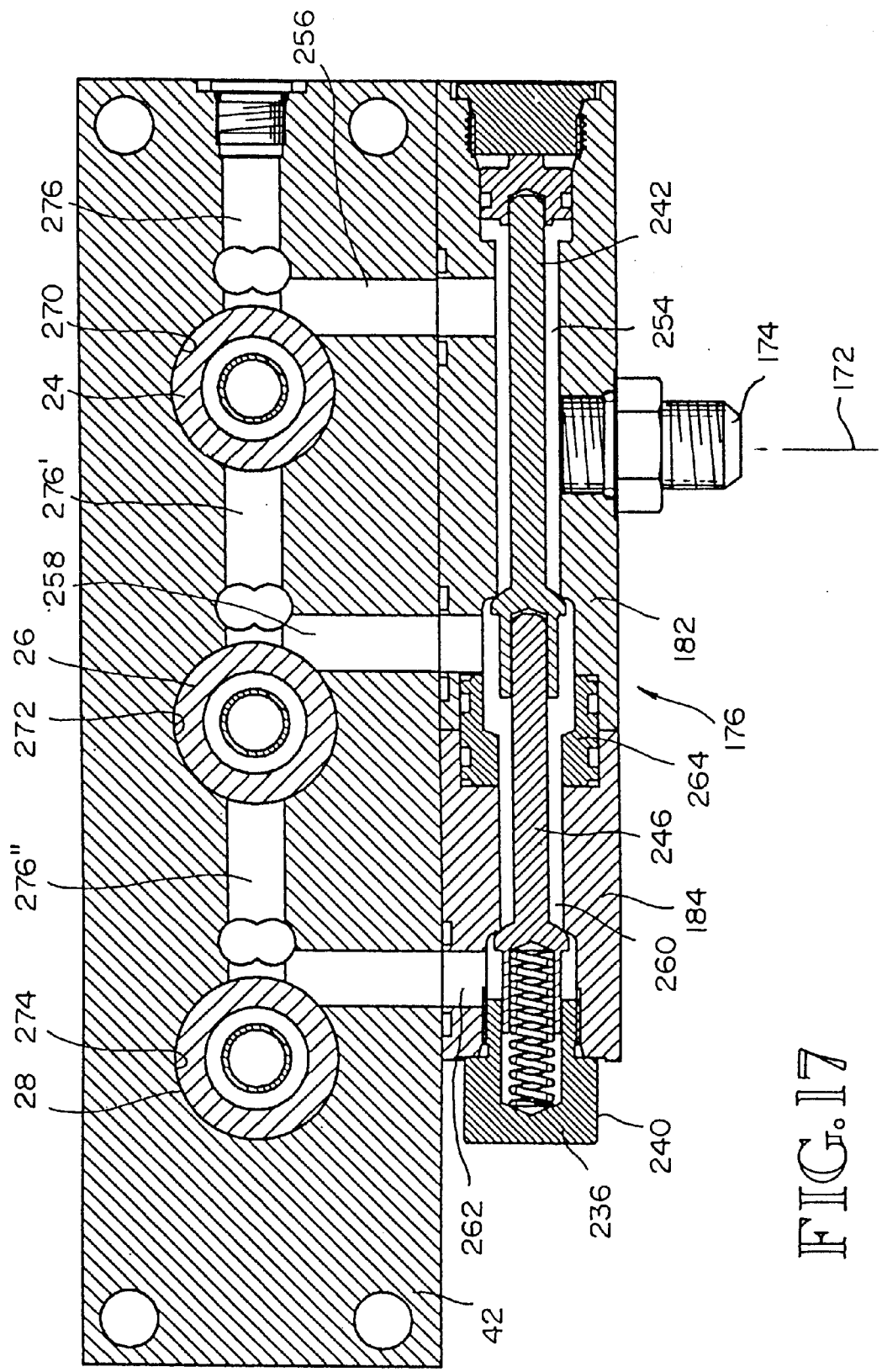
FIG. 17 is a sectional view taken substantially along line 17—17 of FIG. 3, showing full diameter portions of the piston rods within the piston rod openings in the cylinder head.
Figure 17A:
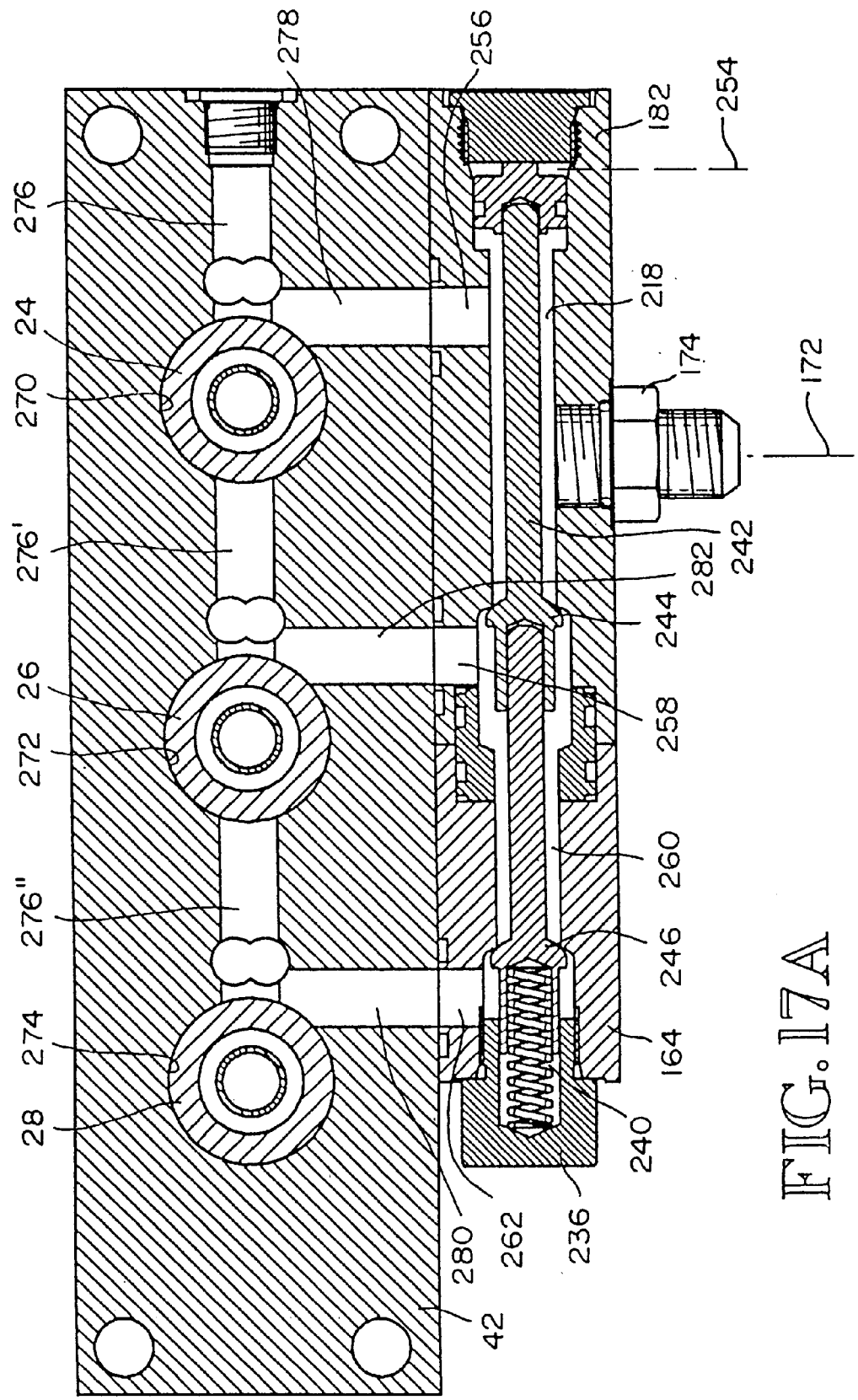
FIG. 17A is a view like FIG. 17, but showing reduced diameter portions of the middle and right side piston rod in alignment with the manifold passageway in the cylinder head forming member.
Figure 21:
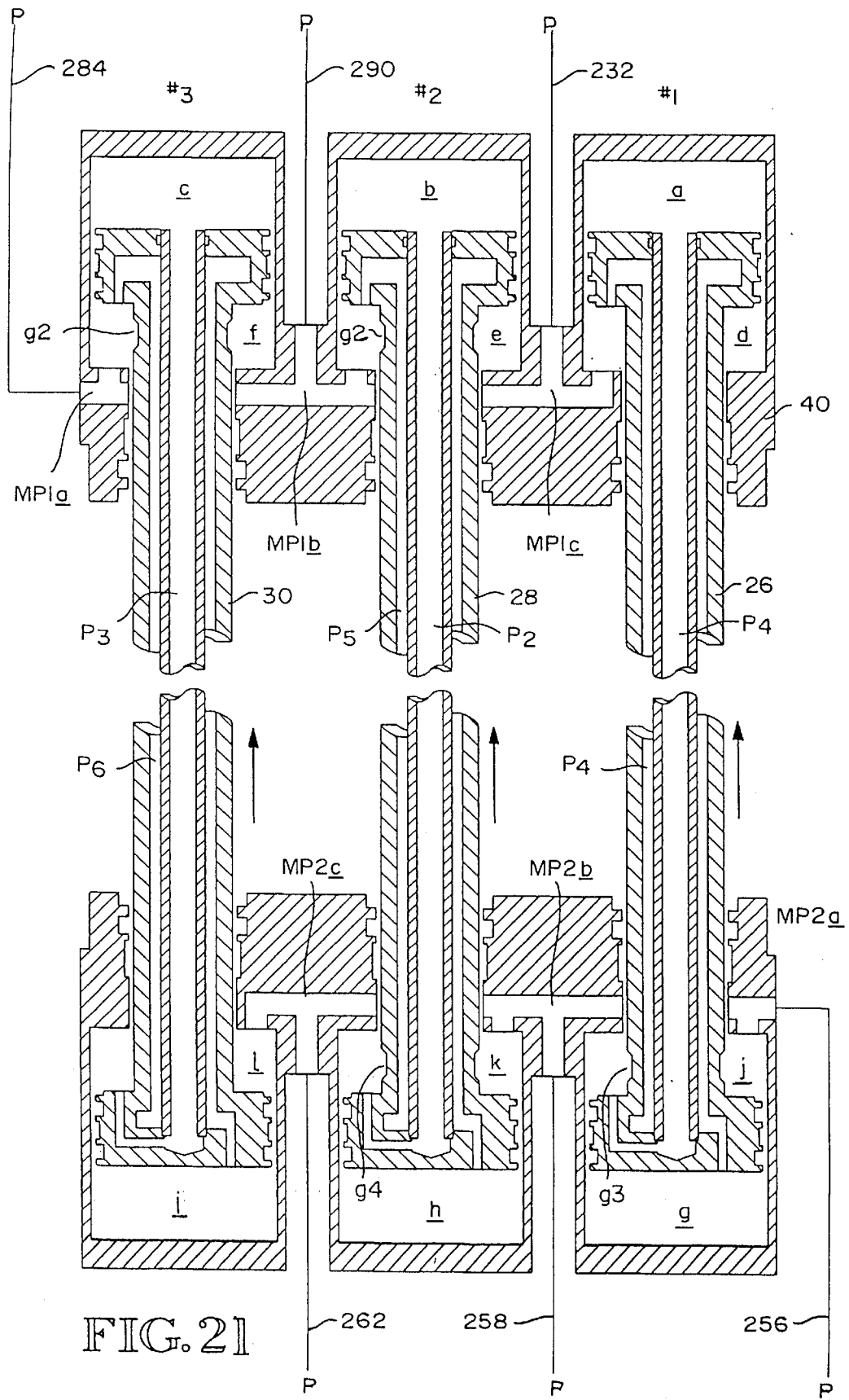
FIGS. 21–30 are sequential views in schematic form, with FIG. 21 showing all three of the piston rods moving together towards the rear of the conveyor, for advancing a load that is on the conveyor.

As best shown by FIGS. 17 and 17A, the cylinder head member 42 includes three piston rod receiving openings 270, 272, 274 in which the piston rods 24, 26, 28 are received. A manifold passageway 276 extends from an inlet/outlet port 278, into the member 42. A first segment of manifold passageway 276 extends from port 278 to one side of piston rod opening 270. A second segment 276' extends from an opposite side of piston rod opening 270 to the first side of the next piston rod opening 272. A third segment 276" extends from the second side of piston rod opening 272 over to the adjacent side of piston rod opening 276. A port 280 connects passageway segment 276" to port 262. Port 282 connects to port 258 with manifold passageway segment 276'. Port 278 connects port 256 with manifold passageway segment 276. Referring to FIGS. 21 and 32, port 284 is connected to port 286. Port 286 is in communication with a first portion of a manifold passageway 288. Port 290 communicates with a second segment 288' of the manifold passageway. Port 232 communicates with a third segment 288" of the manifold passageway.

As best shown in FIGS. 12, 14 and 18, 20, when the piston heads 104 are substantially against the cylinder head forming member 40, the girth grooves in the end portions of the tubular part of piston rods 26 and 28 are aligned with the manifold passageway segments in cylinder head forming member 40. In similar fashion, when the piston heads 106 are substantially against the cylinder head forming member 42, the girth grooves in the end portions of member 102 for piston rods 26, 28 are aligned with the manifold passageway segments in the cylinder head forming member 42. When the piston heads 104, 106 are moved away from the cylinder head forming members 40, 42, full diameter portions of the piston rod member 102 are in the cylinder rod receiving openings in the cylinder head forming members 40, 42, as shown by FIGS. 12 and 15–18. The girth groove adjacent piston head 104 is designed 292. The girth groove adjacent piston head 106 is designated 294.

A sequence of operation will now be described with particular reference to FIGS. 21–30. In FIGS. 21–30 the first variable volume working chambers are designated a, b, c. The first inward variable volume working chambers are d, e, f. The second outward variable volume working chambers are designated g, h, i. The second inward variable volume working chambers are designated j, k, l.

The passageways that connect the working chambers a, b, c with the working chambers g, h, i are designated p1, p2, p3 respectively. The passageways that connect the working chambers d, e, f with the working chambers g, h, i are designated P4, P5, P6. The manifold passageways in the cylinder head forming members 40, 42 are designated mp-1 and mp-2. The segments of manifold passageway mp-1 are designated mp-1a, mp-1b, mp-1c and mp-2a, mp-2b, mp-2c. The girth grooves are designated g1, g2 and g3, g4.

FIG. 31 includes an arrow and the word "unload" for showing the unloading direction of a conveyor that includes the drive assembly 10. FIG. 21 shows the three piston rods 26, 28, 30 moving together, to move the transverse drive beams 18, 20, 22 connected thereto, and the conveyor slats that are connected to the transverse drive beams 18, 20, 22, in the "unload" direction. See FIG. 3 of the aforementioned U.S. Pat. No. Re. 35,022. In FIG. 21, the three passageways 256, 258, 263 are all connected to pressure "P" and the passageways 232, 290, 284 are all connected to return "R". The switching valve SV (FIG. 31) is shifted to deliver pressure into conduit 172 and port 174. The pressure enters cavity 252 and moves the valve plugs 242, 246 to the left, compressing spring 240. The pressure then flows through the valve cavity and out through passageways 256, 258, 262 into the manifold segments mp-2a, mp2b, mp-2c and then through the chamber ports into the working chambers j, k, l. Some of the fluid pressure moves through the passageways P1, P2, P3 up to the working chambers a, b, c. The fluid expands the chambers j, k, l and a, b, c, moving both sets of pistons, and the piston rods 26, 28, 30, in the "unload" direction. Movement occurs because simultaneously with the introduction of pressure into the working chambers j, k, l, and a, b, c, the working chambers d, e, f, and g, h, i are connected to return "R." Fluid in working chambers d, e, f, moves out of these chambers through the chamber ports leading into manifold segments mp-1a, mp-1b, mp-1c, and from there out through ports 232, 290, 284 to the passageway in the valve and housing 170. At that time, there is pressure in passageway 196 and in pilot chamber 198. This pressure moves the piston 214 and the valve plugs to the right (as illustrated), moving the valve plugs away from the valve seats. This allows fluid entering through passageways 232, 290, 284 to flow through the valve and out passageway 168 and onto the return port 164 in the switching valve SV. As the piston components move, fluid in working chambers g, h, i, are forced out of these chambers and into passageways P4, P5, P6, an into first working chambers d, e, f, and then into the manifold passageway mp-1a, mp-1b, mp-1c and then out through the passageways 232, 290, 284.

Figure 22:
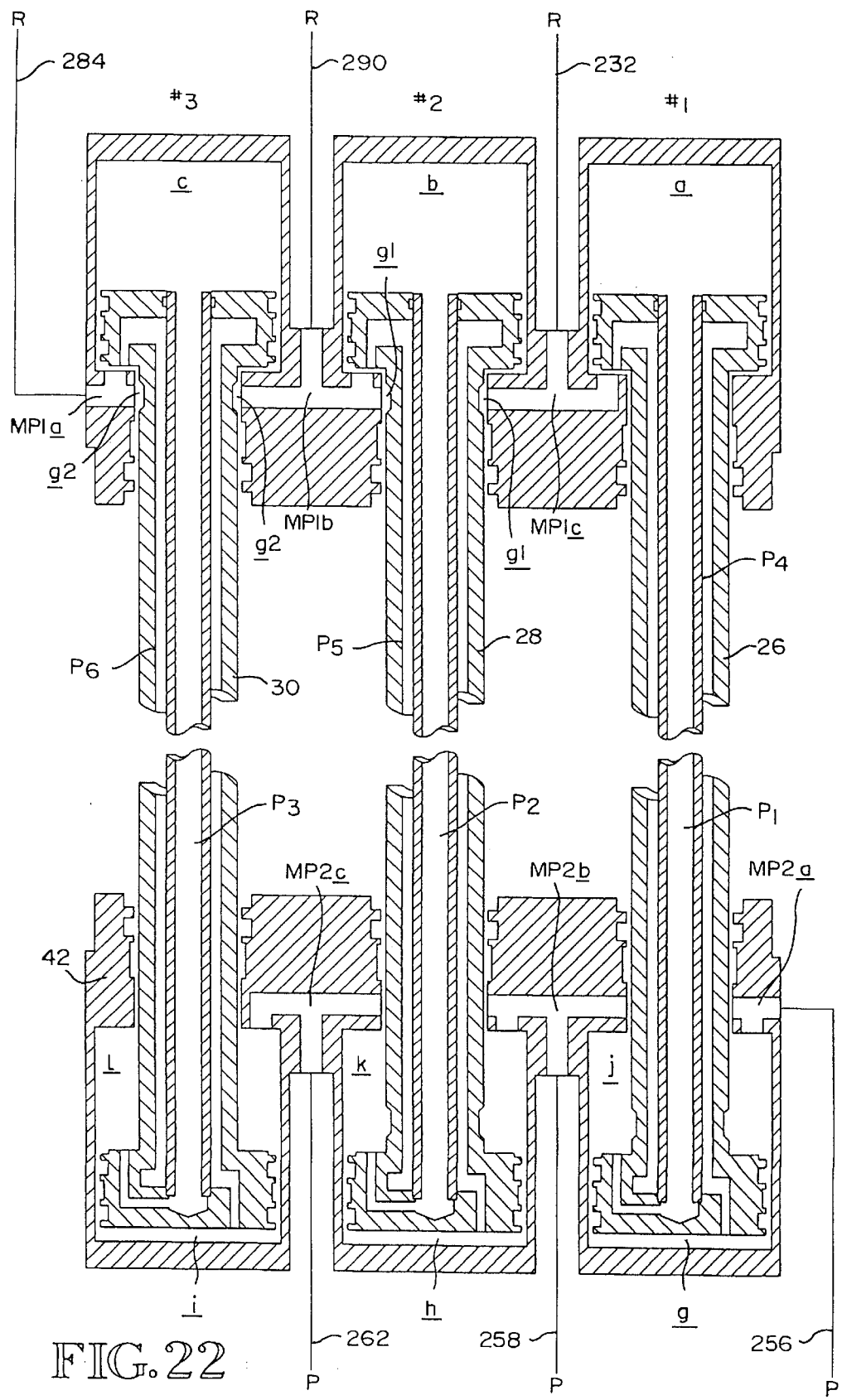
Figure 23:
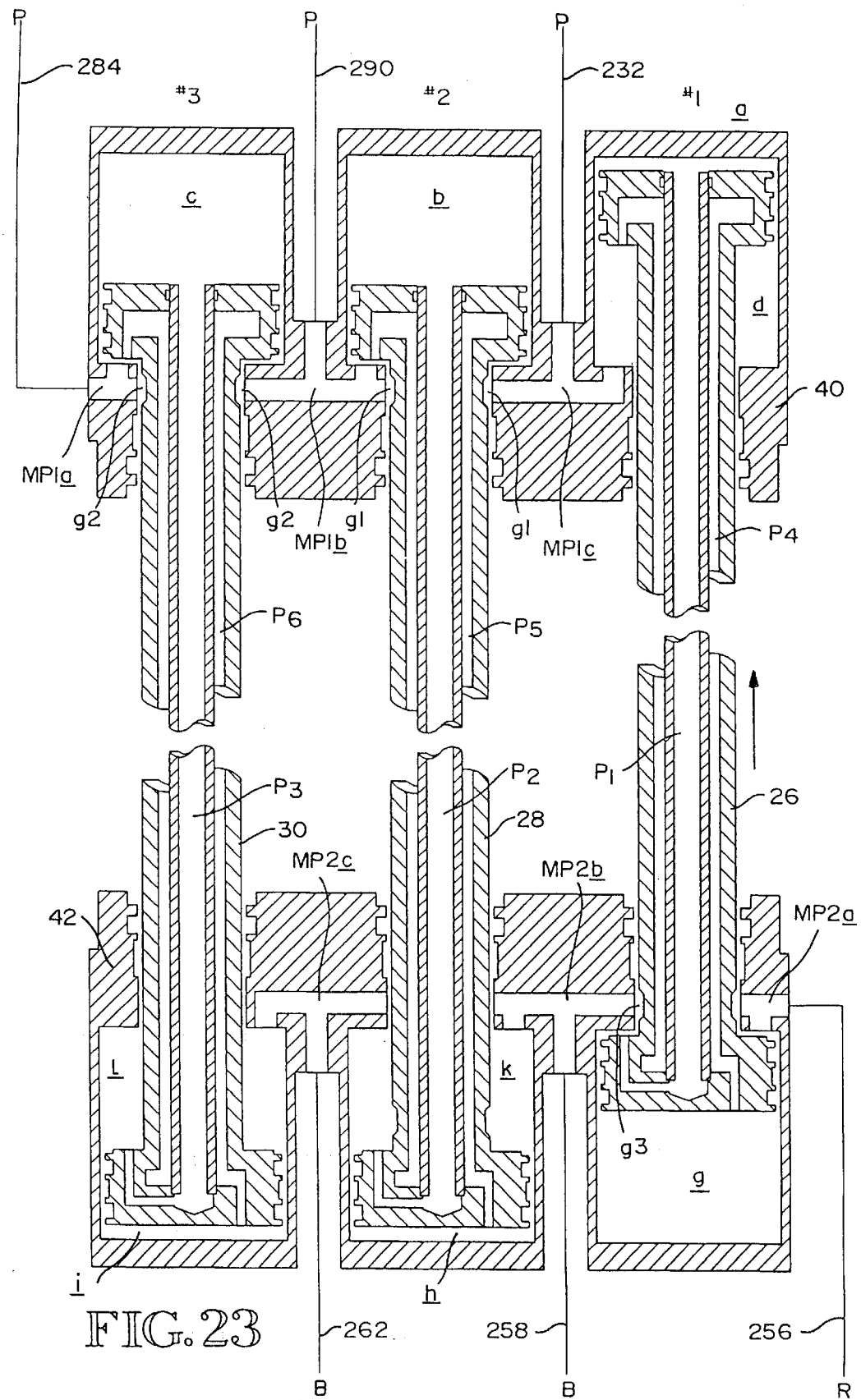
Figure 24:
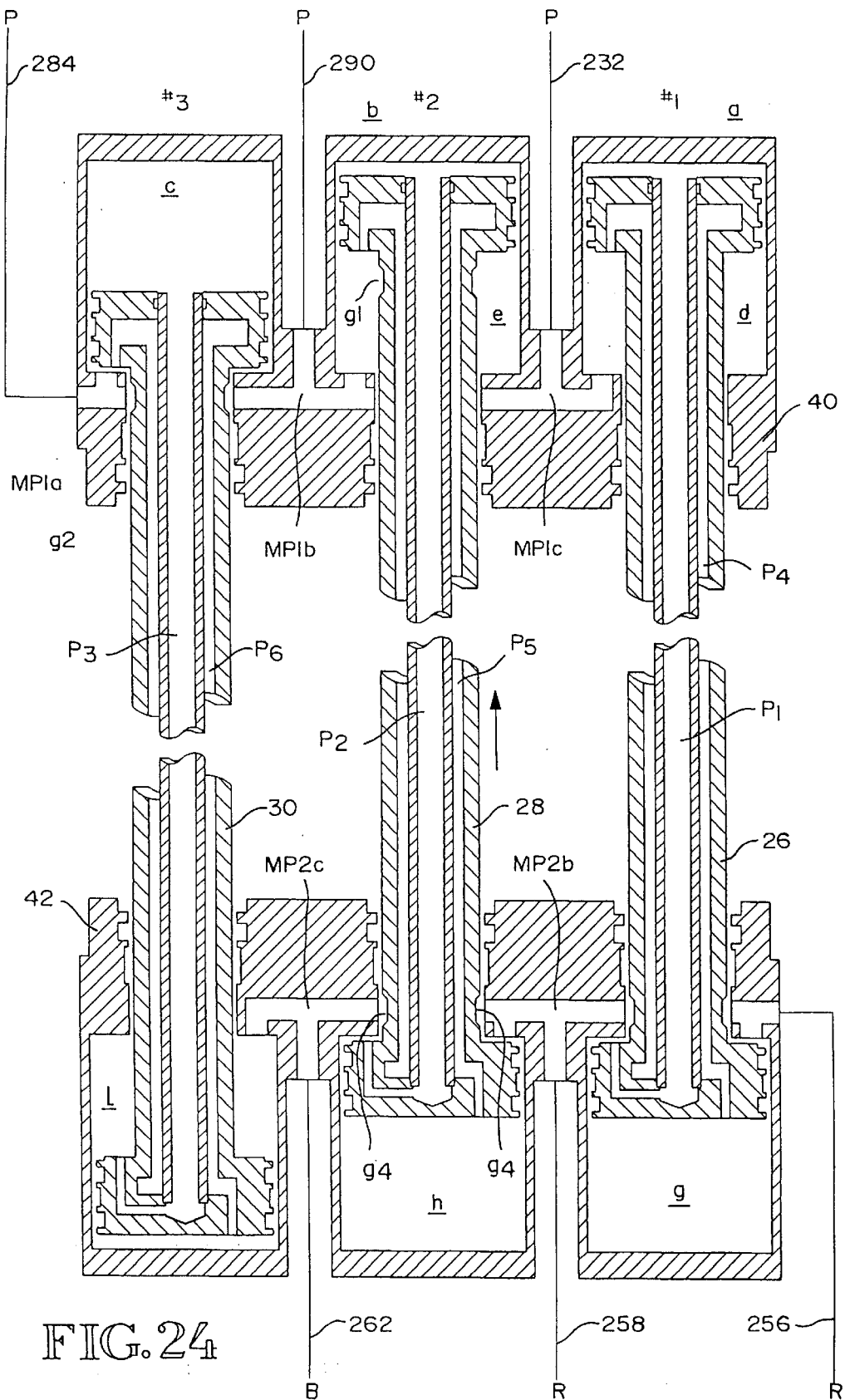
Figure 25:
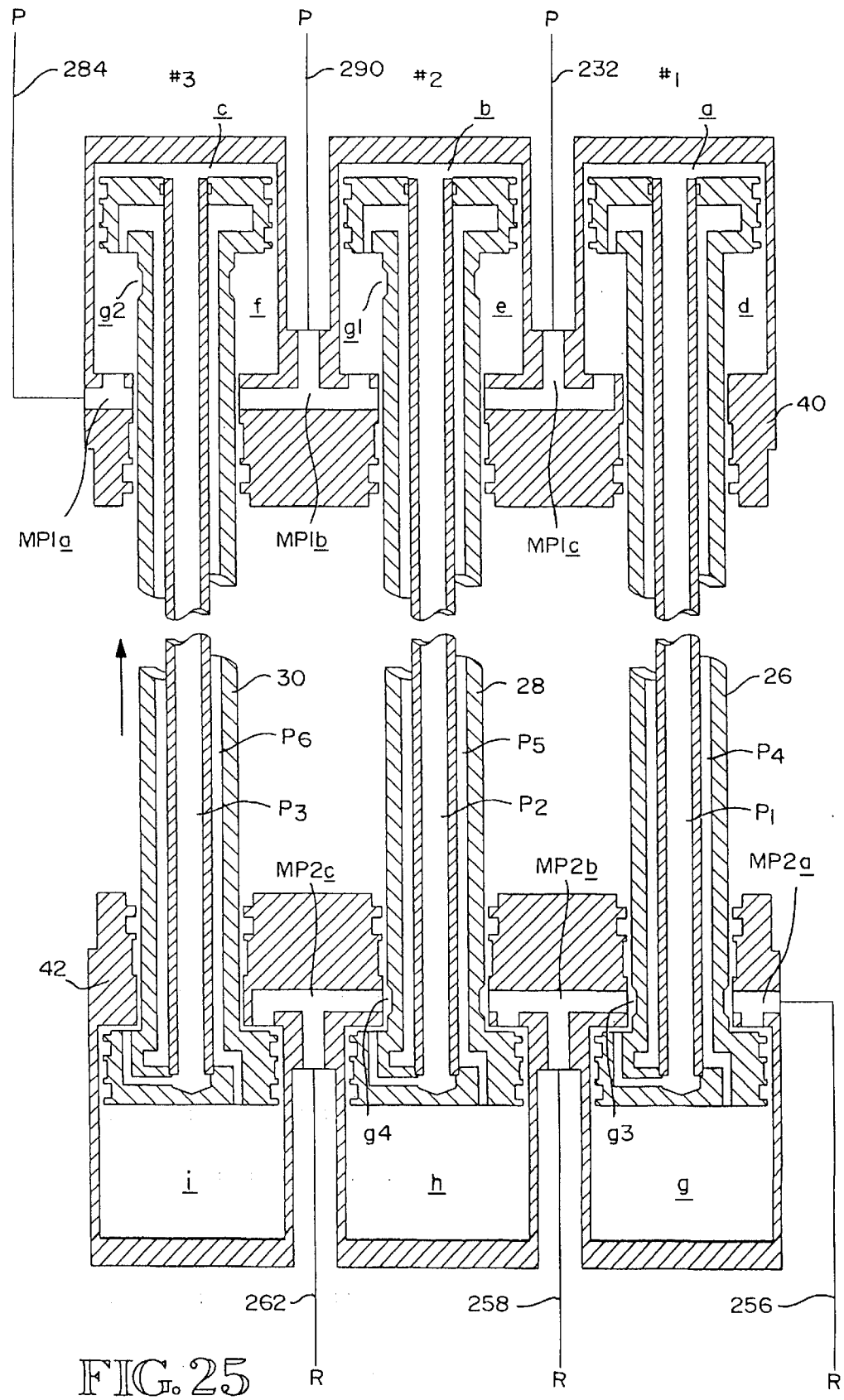

FIG. 22 shows the piston rods 26, 28, 30 fully extended. The girth grooves g1, g2 are shown to be in alignment with the manifold passageway segments mp-1a, mp-1b, mp-1c. About simultaneous with the FIG. 22 condition the switching valve SV is switched to connect passageway 166 to pressure P and passageway 172 to return. FIG. 23 shows passageways 232, 290, 284 connected to pressure P and shows passageway 256 connected to return R. FIG. 31 shows that passageway 256 is connected to passageway 172 via cavity 254 in valve housing 176. The pressure from passageways 232, 290, 284 enters manifold passageway segments mp-1a, mp-1b, mp-1c and is communicated via chamber ports with working chambers d, e, f, and via the passageways P4, P5, P6 with the working chambers g, h, i. However, at this time, the full diameter portion of piston rod 28 that is within the piston rod receiving opening for piston rod 28 in cylinder head forming member 42 blocks flow out from working chamber 1. Working chamber j is never blocked, and so piston rod 26 moves immediately upon introduction of pressure into working chamber d and working chamber g, via passageway P4. During movement of piston rod P1 from its position shown in FIG. 22 to its position shown in FIG. 23, the full diameter portion of piston rod 26 is within the piston rod receiving opening for piston 26 and it blocks flow from manifold passageway segment mp-2b to manifold passageway segment mp-2a and passageway 256. As a result, flow through passageways 258, 262 is blocked. When the piston rod 26 reaches the position shown in FIG. 23, the girth groove g3 connects manifold passageway segment mp-2b with manifold passageway mp-2a. When this happens, there is a flow of fluid out through the chamber port for chamber k into the manifold passageway mp-2b, and onto passageway 256 leading to return. FIG. 24 shows piston rod 28 in the process of movement, owing to the flow of fluid out from working chamber k. It also shows the piston rod 28 substantially reaching full retraction, and girth groove g4 positioned to connect manifold passageway segment mp-2c with manifold passageway segment mp-2b. This allows fluid flow out from working chamber 1. In response to fluid movement out from working chamber 1, the piston rod 30 moves to a retracted position. FIG. 25 shows all three piston rods 26, 28, 30 fully retracted. It is about this time that there is another switching of switching valve SV, to start the unloading cycle over again from the beginning.

Figure 26:
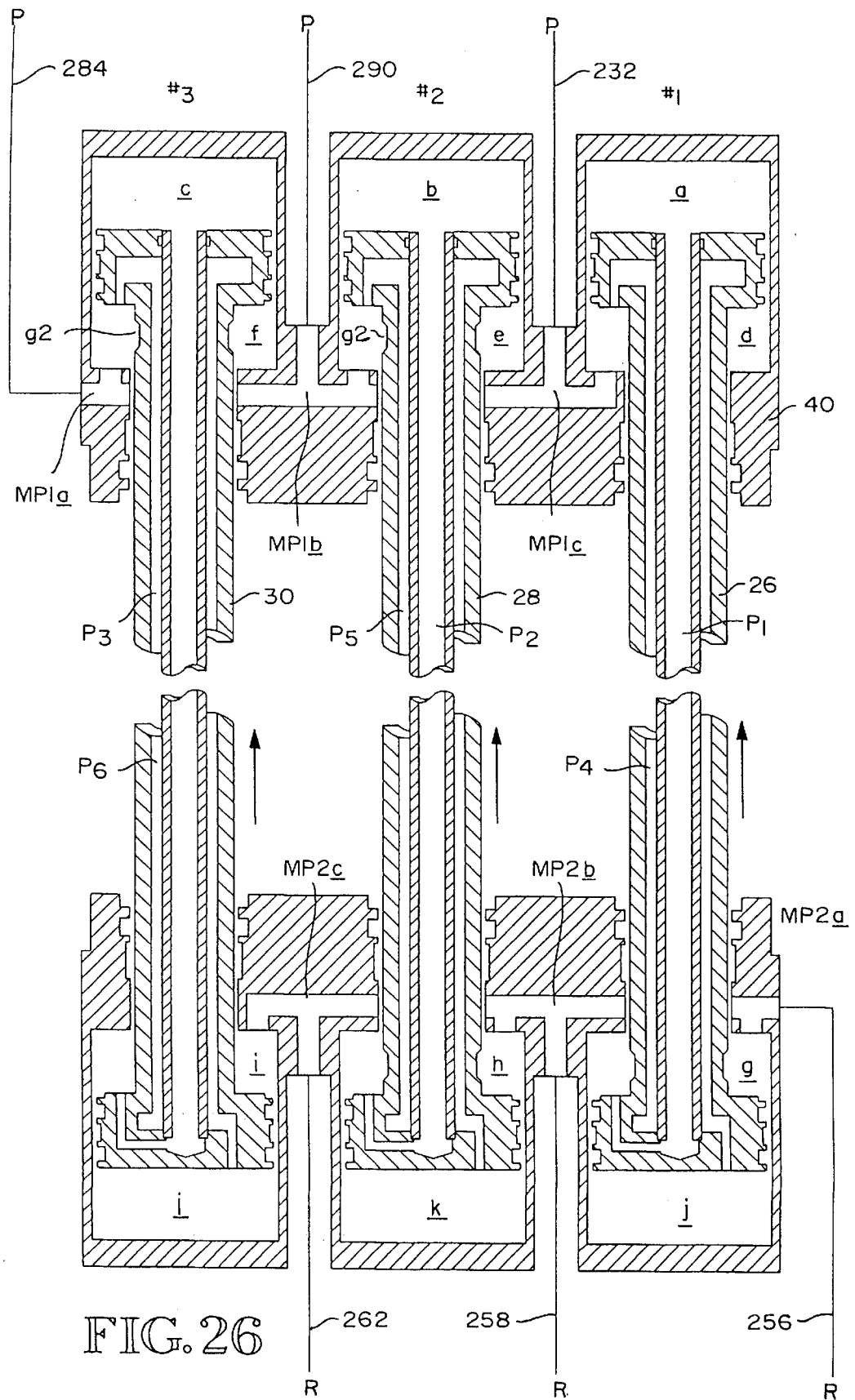
Figure 27:
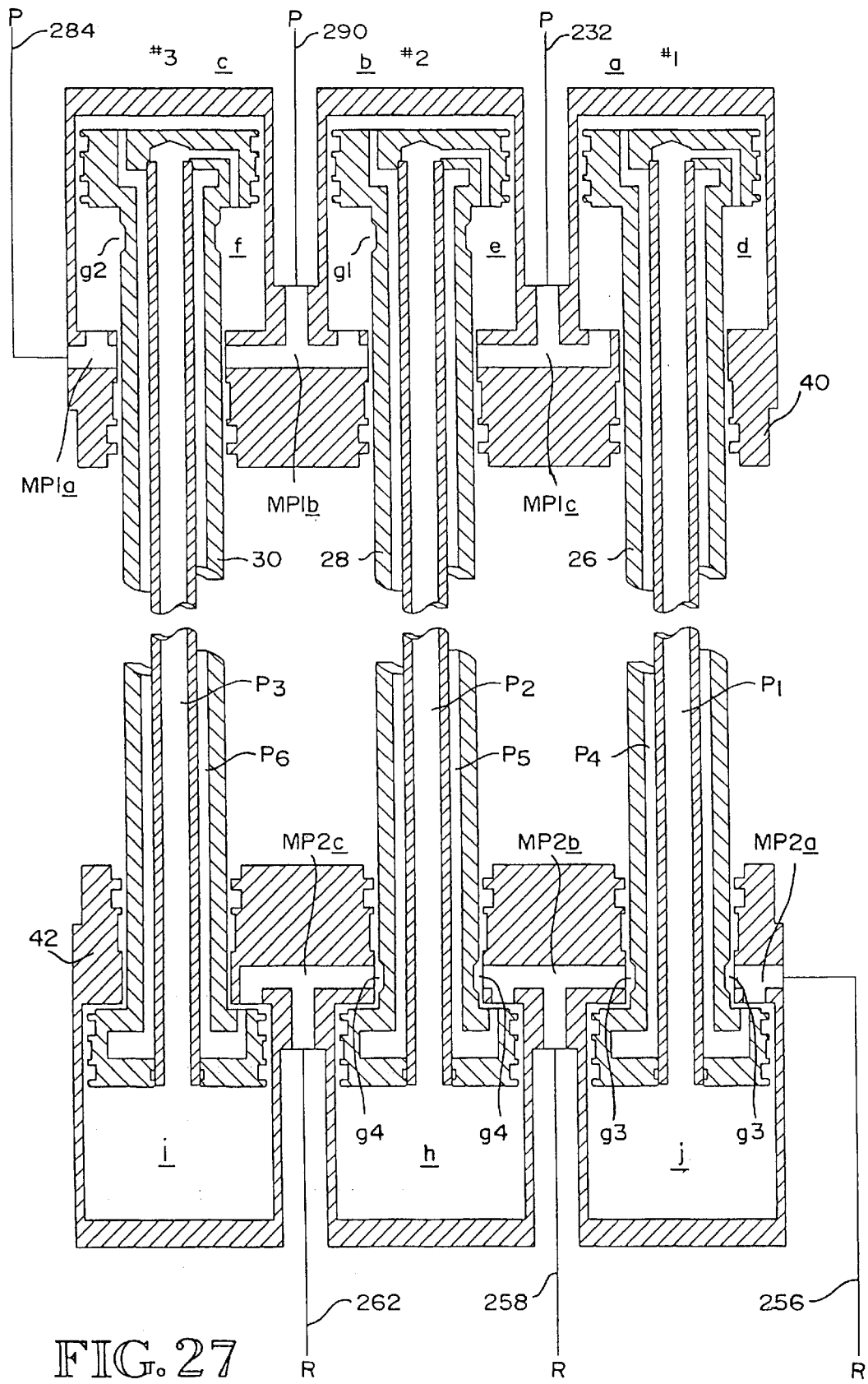
Figure 28:
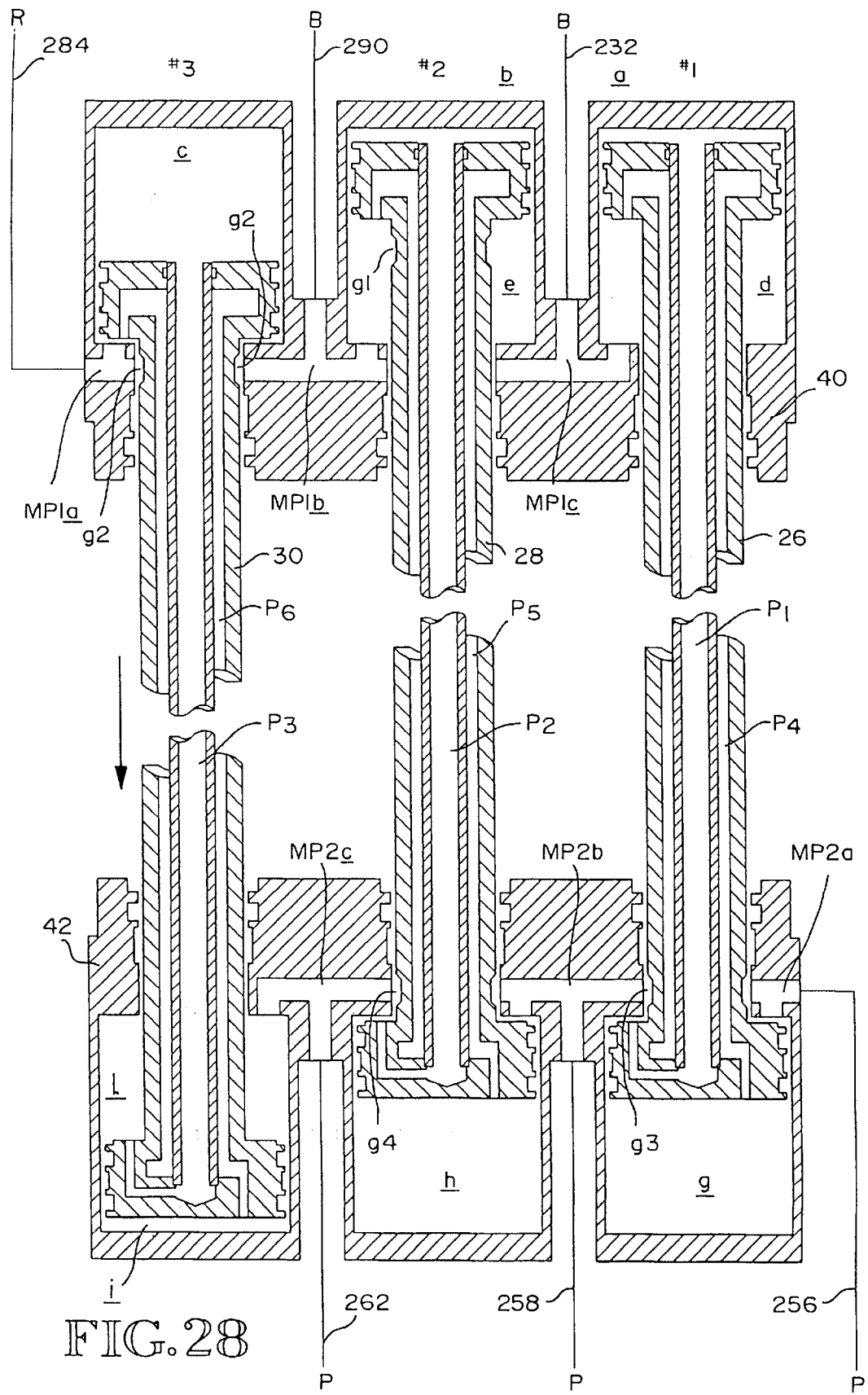

FIG. 26 shows all three piston rods 26, 28, 30, the three transverse drive beams 18, 20, 22 and all of the conveyor slats moving in unison in the "load" direction. This requires operation of the four-way valve 186 for the purpose of connecting passageway 254 with pressure and passageway 196 with return. When passageway 196 is connected to return, the spring acting on the valve spools in housing 170 is free to move the valve spools to the left. This is made possible by the piston 214 being moved to the left. Connection of passageway 254 with pressure connects pilot chamber 196 in valve housing 176 with pressure, causing a movement of piston 214 to the left, as illustrated. As it moves, piston 214 moves with it the valve spools 242, 264, moving the two valve plugs out of seated engagement of their valve seats. In response, pressure enters through passageway 254 and flows through the interior of the valve into the passageways or ports 256, 258, 262, and onto the manifold passageway segments mp-2a, mp-2b, mp-2c. At the same time, pressure in the passageways 232, 290, 280 acts on the valve plugs in housing 170, moving them to the right, as illustrated. FIG. 27 shows the three piston rods 26, 28, 30 fully advanced in the "load" direction. It further shows passageways 232, 290, 284 still connected to pressure and passageways 256, 258, 262 still connected to return. About simultaneously with the piston rods P1, P2, P3 reaching their fully advanced positions in the "load" direction, the switching valve SV is operated to again switch pressure and return between the two ports 162, 164. This connects passageway 284 to return while passageways 256, 258, 262 are connected to pressure. All three piston rods 26, 28, 30 want to retract. However, only piston rod 30 can retract because only chambers f, l are connected to return. Chamber f is directly connected to return line 284 via the chamber port leading to manifold segment mp-1a. Chamber l is connected to return via passageway 56 and then chamber f, the chamber port and manifold passageway segment mp-1a. Piston rods 26, 28 cannot move because the fluid is trapped in chambers d, e, g, h. This is because passageways 290, 232 are blocked. However, once piston 30 is fully retracted, its girth groove g2 connects manifold passageway segments mp-1a and mp-1b, allowing fluid to move out from chambers e, h, through manifold passageway segment mp-1b, girth groove 92, manifold passageway segment mp-1a and passageway 284. Fluid leaves chamber h through passageway 5 and chamber e.

Figure 29:
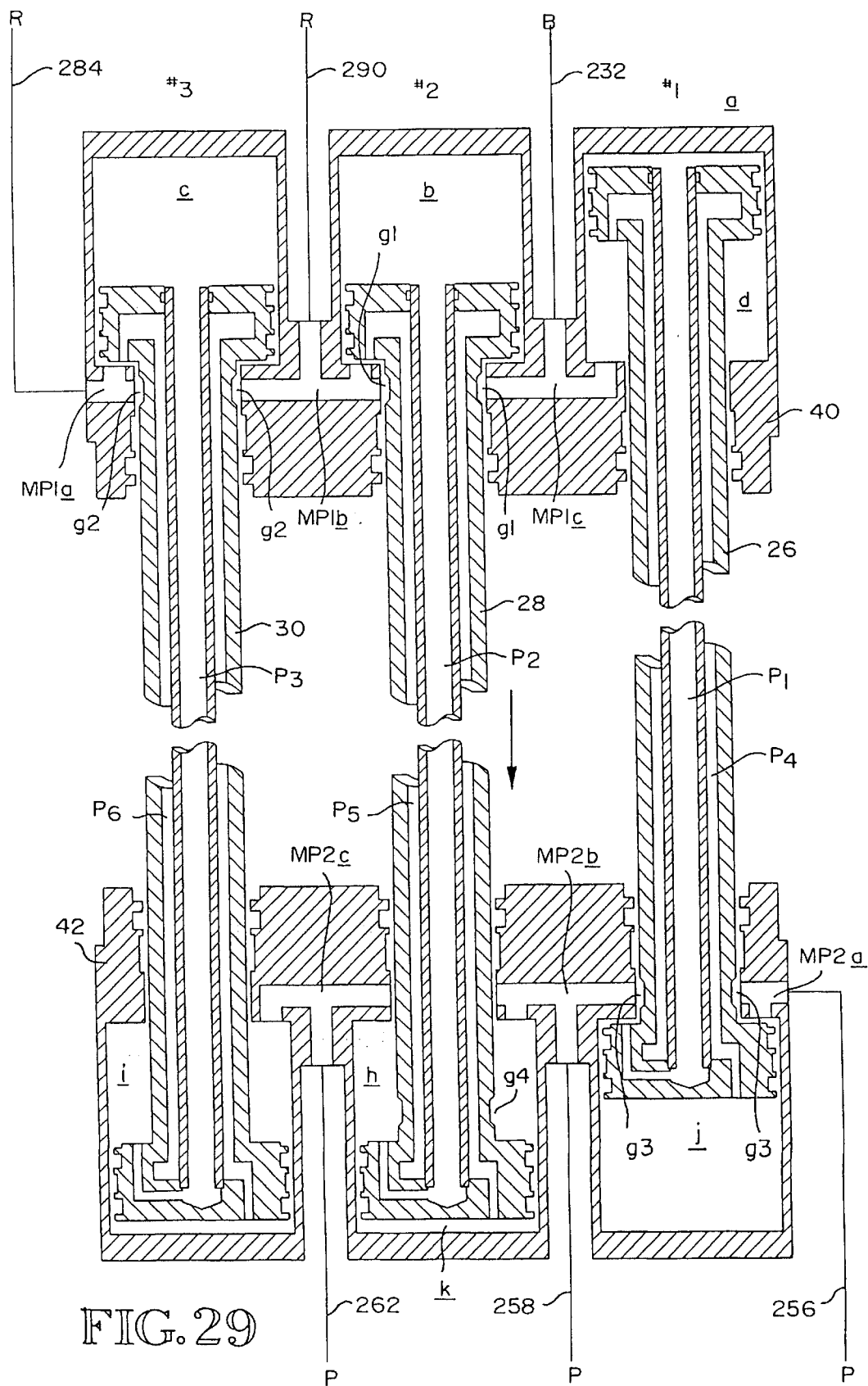
Figure 30:
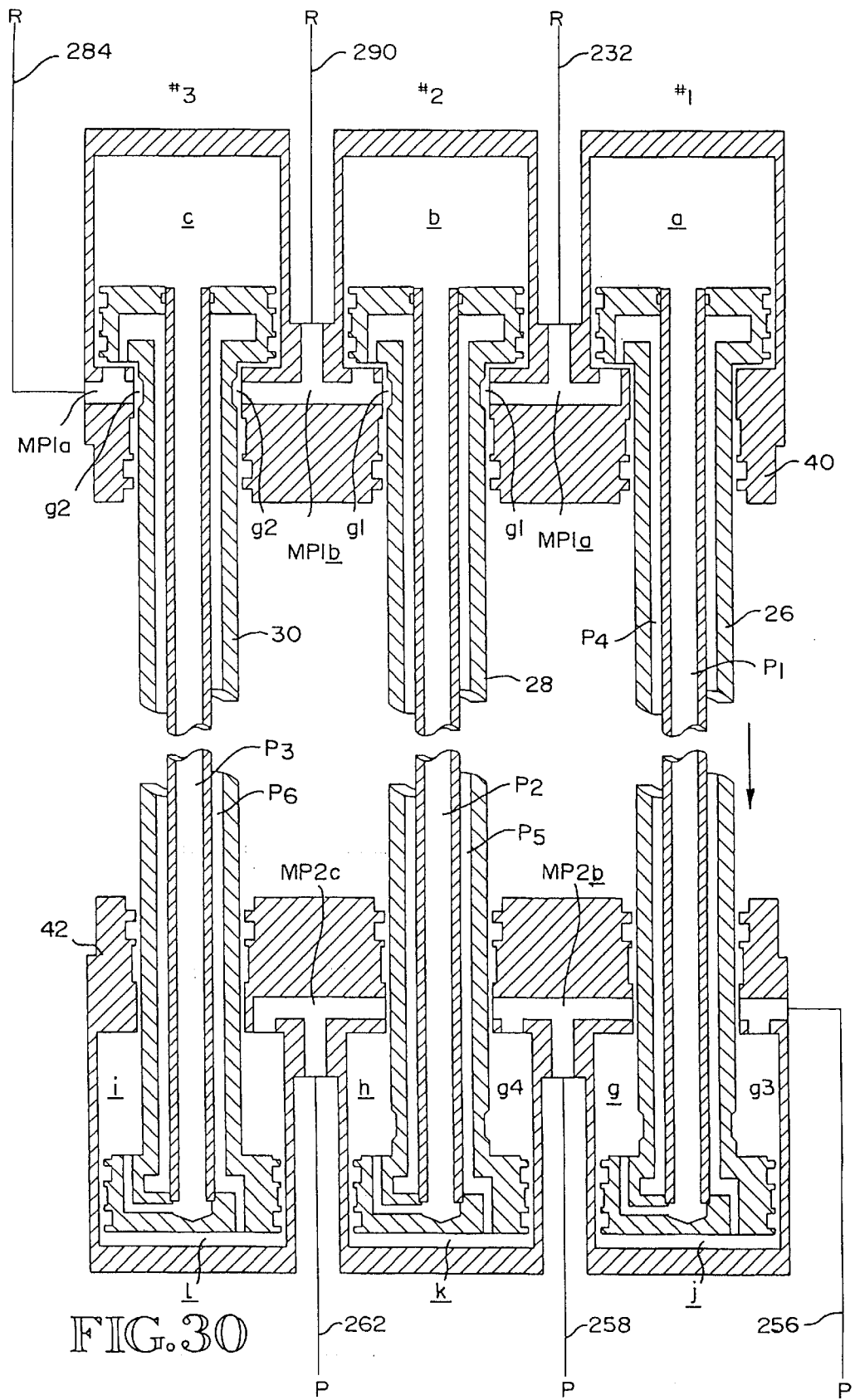

When piston rod 28 is fully retracted, as shown in FIG. 29, girth groove g1 connects manifold passageway segment mp-1b with manifold passageway segment mp-1c. This allows fluid to move from chamber j through passageway P4 into chamber d and move from chamber d through manifold passageway segment mp-1c, through girth groove g1 through manifold passageway segment mp1b, through girth groove g2 through manifold passageway segment mp-1a, and into and through passageway 284, back to return. FIG. 30 shows the piston rod 26 substantially at the end of its retract movement. Once it is fully retracted, all three piston rods 26, 28, 30 again advance in the "load" direction, and the "load" sequence is repeated.

There are some features of the invention that are usable with solid piston rods. In particular, the sleeves 74, 92 can be used with advantage with manifold blocks that are made primarily from aluminum and solid piston shafts. Referring to FIG. 12, for example, the three cylinder tubes could be attached to one side of the manifold block in any suitable manner and the manifold block may be provided with sockets on its opposite sides to receive three sleeves, one for each piston shaft. As explained above, the sleeves are made from a stronger metal than the metal used for the manifold blocks. The use of the sleeves permit the use of wear rings of substantial length, together with an oil seal and a dirt seal. The wear ring is in groove 78, closest to the manifold block. The oil seal is placed in the center groove 76. The dirt seal is placed in the end groove 82. The sleeve and wear ring guide the shaft in a substantially true path where it moves through the manifold block. Thus, the shaft does not impose any great wear on the manifold block.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A hydraulic drive assembly, comprising:

three side-by-side cylinder tubes, each having a first end and a second end;

a cylinder head member to which the first ends of the cylinder tubes are connected;

an end wall at the second end of each cylinder tube, closing the second end of the cylinder tube;

a cylinder space formed in and by each said cylinder tube, axially between the end wall at the second end of the tube and the cylinder head member at the first end of the tube;

a piston head inside of each cylinder tube, axially dividing the cylinder space into an inward variable volume working chamber and an outward variable volume working chamber;

said cylinder head member including a piston rod receiving opening for each piston rod;

three piston rods, one for each cylinder tube, said piston rods having first and second opposite ends, with the first end of each piston rod being connected to the piston head in its cylinder tube and extending from said piston head through the inward variable volume working chamber to and through its piston rod opening in the cylinder head member, and onto the second end of the piston rod;

a manifold passageway in the cylinder head having an inlet/outlet port, said manifold passageway extending inwardly into the cylinder head member from said inlet/outlet port, to one side of the piston rod opening for the piston rod that is closest to the inlet/outlet port, and then from the opposite side of this piston opening to a first side of the center piston rod opening for the center piston rod, and then from an opposite side of said center piston rod opening to a chamber port that connects the manifold passageway to the inward variable volume working chamber of the next cylinder tube;

a second chamber port connecting the manifold passageway to the inward variable volume working chamber of the center cylinder tube; and a third chamber port connecting the manifold passageway to the inward variable volume working chamber of the cylinder tube that is closest to the inlet/outlet port;

wherein the piston rods for the cylinder tube closest the inlet/outlet port and the adjacent center cylinder tube function as valve spools for the manifold passageway where it extends crosswise of the cylinder rod openings for such cylinder rods, said valve spool forming piston rods each including a groove that extends at least part way around the piston rod and when a said piston head on a said piston rod is at an end position adjacent the cylinder head member, the recess on the piston rod forms a part of the manifold passageway, and when the piston head is moved away from the cylinder head member towards the end wall for said cylinder tube, a cylindrical portion of the piston rod moves into the piston rod opening and blocks flow from the portion of the manifold passageway on one side of said piston rod opening to a portion of the manifold passageway on the opposite side of the opening.

2. A hydraulic drive assembly according to claim 1, wherein a passageway extends lengthwise from each outward variable volume working chamber, first through the piston head and then through the piston rod onto the second end of the piston rod.

3. The hydraulic drive assembly according to claim 2, wherein a passageway extends from each inward variable volume working chamber, first through the piston head and then through the piston rod onto the second end of the piston rod.

4. A hydraulic drive assembly according to claim 1, wherein each piston rod opening in the cylinder forming member comprises an internally threaded socket that opens from the cylinder forming member in the same direction that the piston rods extend, tubular sleeve for each socket, each said sleeve having an externally threaded end portion that threads into the threads of its socket, each said sleeve including a center opening through which its piston rod extends, and each said sleeve further including a seal that surrounds, its piston rod and seals between the sleeve and the piston rod.

5. A hydraulic drive assembly according to claim 4, wherein each sleeve also includes a wear ring that surrounds its piston rod.

6. A hydraulic drive assembly according to claim 5, wherein each sleeve also includes a dirt seal at its free end that surrounds its piston rod.

7. A hydraulic drive assembly according to claim 4, wherein the cylinder head forming member is basically aluminum and the sleeve is basically steel.

8. A hydraulic drive assembly according to claim 7, wherein each sleeve also includes a wear ring that surrounds its piston rod.

9. A hydraulic drive assembly according to claim 8, wherein each sleeve also includes a dirt seal at its free end that surrounds its piston rod.

10. A hydraulic drive assembly comprising:

a cylinder block constructed from a metal that is primarily aluminum, including three sockets on one side in which end portions of three side-by-side cylinder tubes are received, and three concentric, internally threaded sockets on the opposite side of the block;

a piston head in each cylinder tube;

said cylinder head block including three piston rod receiving openings that extend between and are concentric with the respective sockets on the opposite sides of the block;

a separate piston rod disposed in each piston rod receiving opening, each piston rod having an end portion that is connected to a piston head within a cylinder chamber;

a tubular sleeve for each internally threaded socket, constructed from a metal that is stronger than the metal from which the block is made;

said piston rods extending from the piston heads through the piston rod receiving openings in the block and then through center openings in the sleeves; and each sleeve including an internal groove for an oil seal ring, whereby an oil seal ring may be placed within the groove in surrounding relationship with the piston rod, to seal between the sleeve and the piston rod.

11. A hydraulic drive assembly according to claim 10, wherein each sleeve also includes a wear ring groove, each said wear ring groove surrounding its piston rod, whereby a wear ring can be put into the groove and said wear ring will also surround the piston rod.

12. A hydraulic drive assembly according to claim 11, wherein each sleeve also includes a dirt seal receiving groove at its free end, whereby a dirt seal can be placed in the groove in a surrounding relationship to the piston rod.

* * * * *